(12) United States Patent
Harada et al.

(10) Patent No.: US 12,058,531 B2
(45) Date of Patent: Aug. 6, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP); Shohei Yoshioka, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 524 days.

(21) Appl. No.: 17/291,827

(22) PCT Filed: Nov. 9, 2018

(86) PCT No.: PCT/JP2018/041764
§ 371 (c)(1),
(2) Date: May 6, 2021

(87) PCT Pub. No.: WO2020/095458
PCT Pub. Date: May 14, 2020

(65) Prior Publication Data
US 2021/0392505 A1    Dec. 16, 2021

(51) Int. Cl.
| | | |
|---|---|---|
| H04W 24/08 | (2009.01) | |
| H04W 16/14 | (2009.01) | |
| H04W 72/12 | (2023.01) | |
| H04W 72/1273 | (2023.01) | |
| H04W 72/23 | (2023.01) | |
| H04W 74/0808 | (2024.01) | |

(52) U.S. Cl.
CPC .......... *H04W 16/14* (2013.01); *H04W 24/08* (2013.01); *H04W 72/12* (2013.01); *H04W 72/1273* (2013.01); *H04W 72/23* (2023.01); *H04W 74/0808* (2013.01)

(58) Field of Classification Search
CPC ..... H04W 16/14; H04W 72/23; H04W 24/08; H04W 72/12; H04W 72/1273; H04W 74/0808
See application file for complete search history.

(56) References Cited

U.S. PATENT DOCUMENTS

| | | | |
|---|---|---|---|
| 2019/0191457 A1* | 6/2019 | Si | .......................... H04W 48/12 |
| 2019/0306832 A1* | 10/2019 | Si | ...................... H04W 72/0446 |
| 2020/0053637 A1* | 2/2020 | Tsai | ........................ H04L 5/001 |

OTHER PUBLICATIONS

R1-1810382 Vivo "Discussion on the channel access procedures" 3GPP WG1 #94bis Chengdu Oct. 8-12, 2018 (Year: 2018).*

(Continued)

*Primary Examiner* — Basil Ma
(74) *Attorney, Agent, or Firm* — Osha Bergman Watanabe & Burton LLP

(57) ABSTRACT

A user terminal includes a receiving section that receives a first synchronization signal block in a first carrier to which listening is applied and monitors a first downlink control channel for scheduling first system information based on the first synchronization signal block, and a control section that determines resources of the first downlink control channel using a determination method different from a determination method of resources of a second downlink control channel for scheduling second system information in a second carrier to which the listening is not applied. According to one aspect of the present disclosure, appropriate communication can be performed in a band to which listening is applied.

7 Claims, 21 Drawing Sheets

MULTIPLEXING PATTERN 1

SSB
CORESET
PDSCH

(56) References Cited

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2018/041764, mailed Jan. 29, 2019 (5 pages).
Written Opinion issued in International Application No. PCT/JP2018/041764; Dated Jan. 29, 2019 (3 pages).
Office Action issued in counterpart Japanese Patent Application No. 2020-556464 mailed on Feb. 14, 2023 (9 pages).
Notice of Reasons for Refusal issued in Japanese Application No. 2020-556464 mailed on Nov. 8, 2022 (8 pages).
Huawei, HISilicon, "DL channels and signals in NR unlicensed band", 3GPP TSG RAN WG1 Meeting #95, R1-1812192, Spokane, USA, Nov. 12-16, 2018 (7 pages).
Spreadtrum Communications, "Discussion on DRS in NR-U", 3GPP TSG RAN WG1 Meeting #95, R1-1813077, Spokane, USA, Nov. 12-16, 2018 (11 pages).
3GPP Tsg Ran WG1 Meeting #94bis; R1-1810382 "Discussion on the channel access procedures" vivo; Chengdu, China; Oct. 8-12, 2018 (8 pages).
Extended European Search Report issued in European Application No. 18939697.1, dated Jun. 1, 2022 (10 pages).
Office Action issued in counterpart Chinese Patent Application No. 201880100590.1 mailed on Jun. 16, 2023 (13 pages).

* cited by examiner

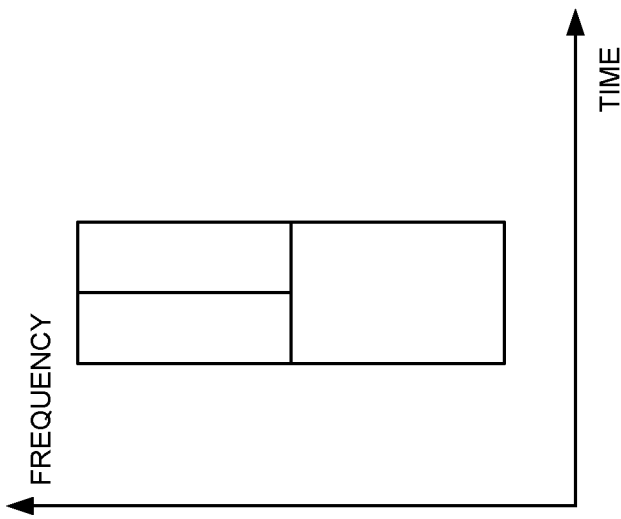
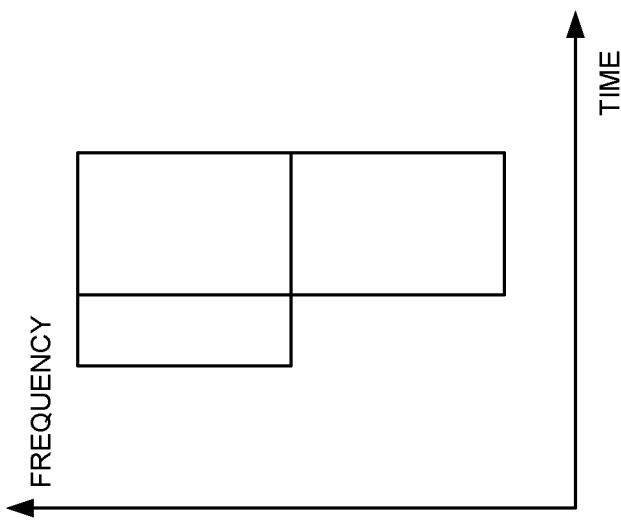
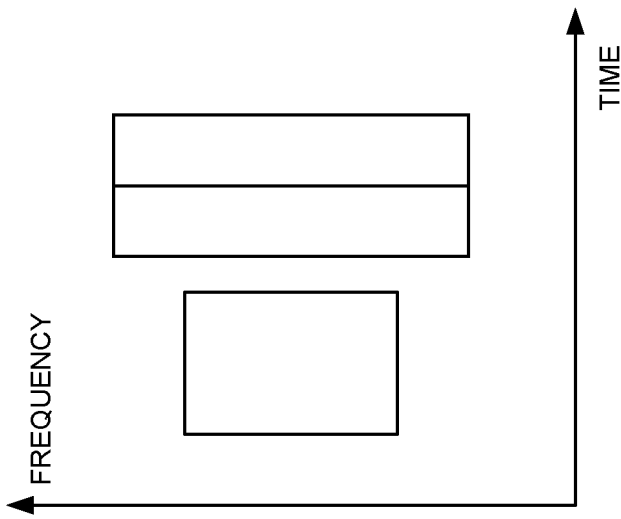

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {$N_{symb}^{CORESET}$, if $i$ is odd} |
| 2 | 2 | 1 | 1 | 0 |
| 3 | 2 | 2 | 1/2 | {0, if $i$ is even}, {$N_{symb}^{CORESET}$, if $i$ is odd} |
| 4 | 5 | 1 | 1 | 0 |
| 5 | 5 | 2 | 1/2 | {0, if $i$ is even}, {$N_{symb}^{CORESET}$, if $i$ is odd} |
| 6 | 7 | 1 | 1 | 0 |
| 7 | 7 | 2 | 1/2 | {0, if $i$ is even}, {$N_{symb}^{CORESET}$, if $i$ is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

FIG. 2

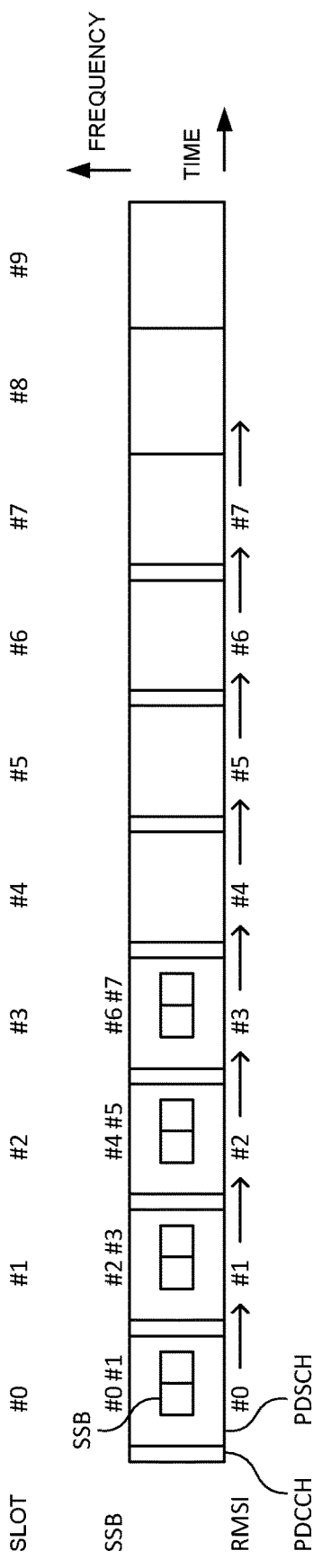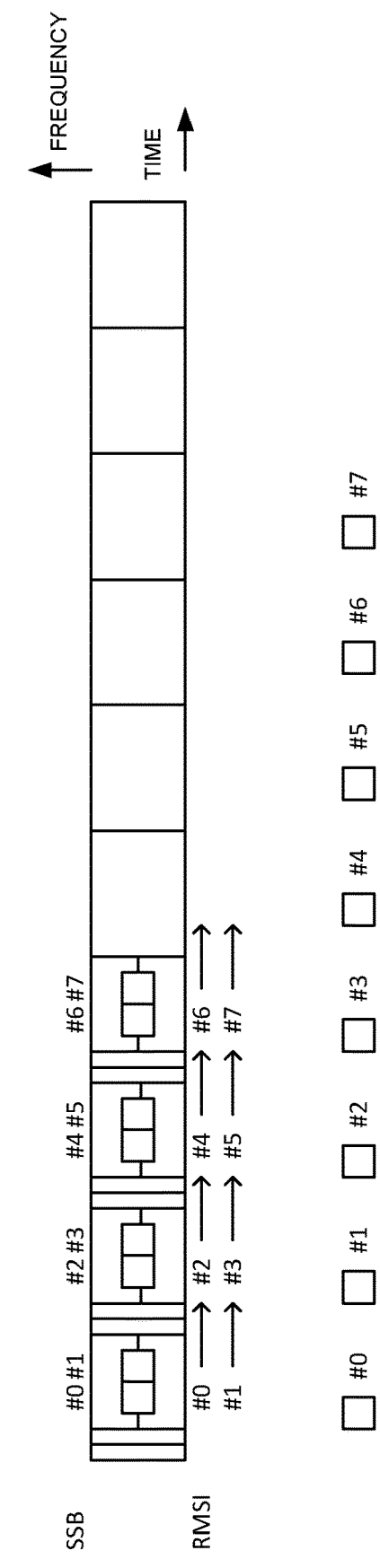

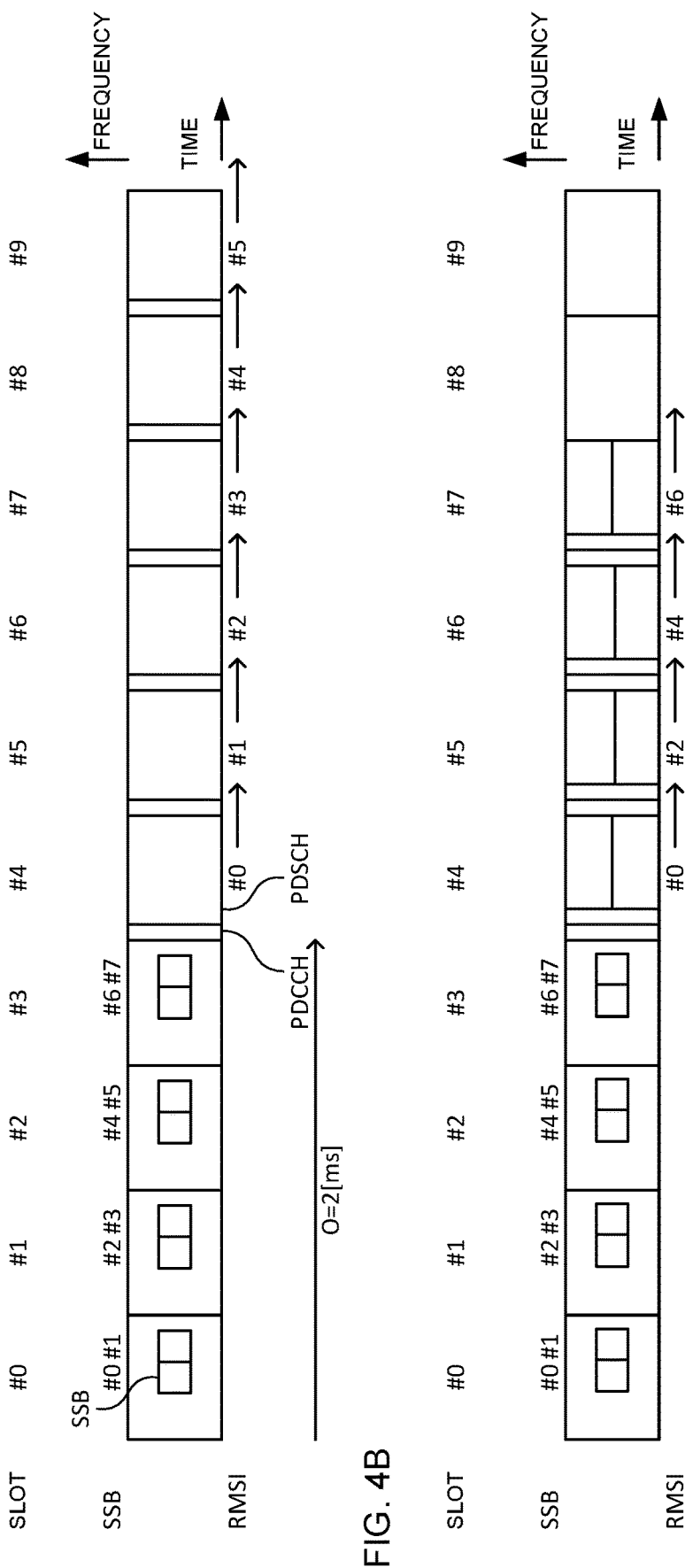

| Index | PDCCH monitoring occasions (SFN and slot number) | First symbol index (k = 0, 1, ... 15) |
|---|---|---|
| 0 | $SFN_C = SFN_{SSB,i}$ $n_C = n_{SSB,i}$ | 0, 1, 6, 7 for $i = 4k$, $i = 4k+1$, $i = 4k+2$, $i = 4k+3$ |

FIG. 5

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

FIG. 11

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 12 |
| 11 | 1 | 48 | 1 | 14 |
| 12 | 1 | 48 | 1 | 16 |
| 13 | 1 | 48 | 2 | 12 |
| 14 | 1 | 48 | 2 | 14 |
| 15 | 1 | 48 | 2 | 16 |

FIG. 12

| Frequency range | SS Block frequency position $SS_{REF}$ | GSCN | Range of GSCN |
|---|---|---|---|
| 0 – 3000 MHz | N * 1200kHz + M * 50 kHz, N=1:2499, M ∈ {1,3,5} (Note 1) | 3N + (M-3)/2 | 2 – 7498 |
| 3000-24250 MHz | 3000 MHz + N * 1.44 MHz N = 0:14756 | 7499 + N | 7499 – 22255 |
| NOTE 1: | The default value for operating bands with SCS spaced channel raster is M=3. | | |

FIG. 13

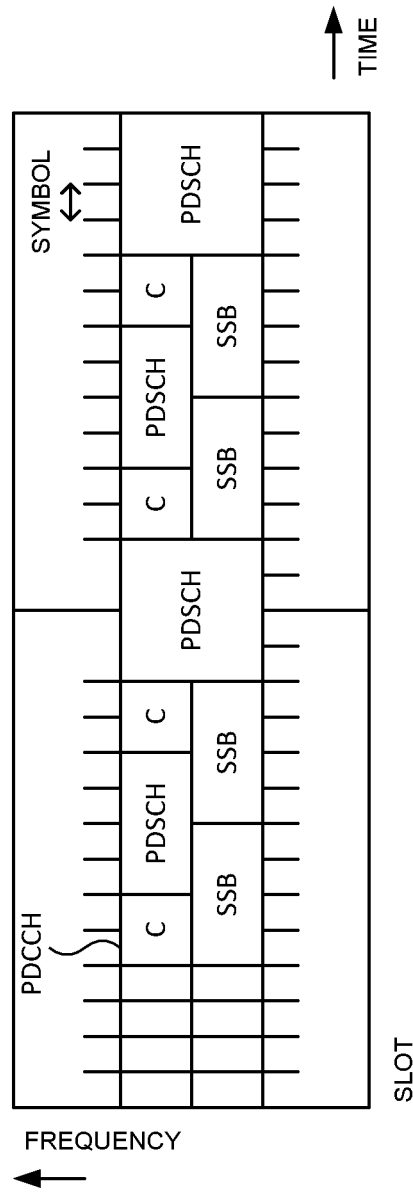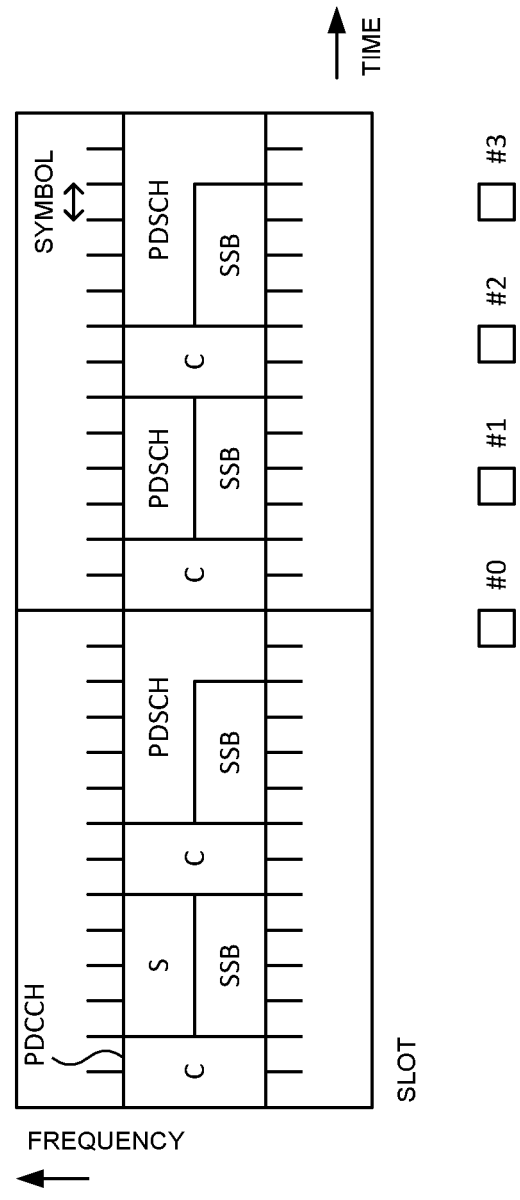
FIG. 14A
FIG. 14B

USER TERMINAL AND RADIO COMMUNICATION METHOD

TECHNICAL FIELD

The present disclosure relates to a user terminal and a radio communication method in a next-generation mobile communication system.

BACKGROUND ART

In the universal mobile telecommunications system (UMTS) network, long term evolution (LTE) has been specified for the purpose of further increasing a data rate, providing low latency, and the like (see Non Patent Literature 1). In addition, LTE-Advanced (third generation partnership project (3GPP) Rel. (Release) 10-14) has been specified for the purpose of further increasing capacity and sophistication of LTE (3GPP Rel. 8 and 9).

Successor systems to LTE (for example, also referred to as 5th generation mobile communication system (5G), 5G+ (plus), new radio (NR), or 3GPP Rel. 15 or later versions) are also being studied.

In existing LTE systems (for example, Rel. 8 to 12), the specifications have been drafted assuming that exclusive operation is performed in a frequency band licensed to a telecommunications carrier (operator) (also referred to as a "licensed band", a "licensed carrier", a "licensed component carrier (CC)", and so on). As the licensed CC, for example, 800 MHz, 1.7 GHz, 2 GHz, etc. are used.

Further, in the existing LTE system (for example, Rel. 13), in order to extend the frequency band, a frequency band different from the above licensed band (also referred to as an "unlicensed band", an "unlicensed carrier", or an "unlicensed CC") is supported. As the unlicensed band, for example, 2.4 GHz band or 5 GHz band in which Wi-Fi (registered trademark) or Bluetooth (registered trademark) can be used is assumed.

Specifically, in Rel. 13, carrier aggregation (CA) that integrates a carrier (CC) in the licensed band and a carrier (CC) in the unlicensed band is supported. The communication performed using the unlicensed band together with the licensed band is called LAA (License-Assisted Access).

Use of the LAA is being studied also in future radio communication systems (for example, 5th generation mobile communication system (5G), 5G+ (plus), new radio (NR), or 3GPP Rel. 15 or later versions). In the future, it is possible that use of LAA will be considered also in dual connectivity (DC) between the licensed band and the unlicensed band or stand-alone (SA) of the unlicensed band.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the future radio communication systems (for example, 5G, 5G+, NR, and Rel. 15 or later versions), a transmitting apparatus (for example, a base station in the downlink (DL), a user terminal in the uplink (UL)) performs listening (also referred to as "LBT (Listen Before Talk)", "CCA (Clear Channel Assessment)", "carrier sensing", "sensing", "channel access procedure", and so on) for confirming the presence or absence of transmission of other pieces of apparatus (for example, base station, user terminal, Wi-Fi device, and so on) before transmission of data in the unlicensed band.

In order for such a radio communication system to coexist with other systems in the unlicensed band, it is conceivable that the radio communication system complies with a regulation or a requirement in the unlicensed band.

However, if an operation in the unlicensed band is not clearly determined, there is a risk that appropriate communication cannot be performed in the unlicensed band, for example, an operation in a specific communication situation does not conform to the regulation or utilization efficiency of radio resources is reduced.

Therefore, one of objects of the present disclosure is to provide a user terminal and a radio communication method for performing appropriate communication in a band to which listening is applied.

Solution to Problem

In accordance with one aspect of the present disclosure, a user terminal includes a receiving section that receives a first synchronization signal block in a first carrier to which listening is applied and monitors a first downlink control channel for scheduling first system information based on the first synchronization signal block, and a control section that determines resources of the first downlink control channel using a determination method different from a determination method of resources of a second downlink control channel for scheduling second system information in a second carrier to which the listening is not applied.

Advantageous Effects of Invention

According to one aspect of the present disclosure, appropriate communication can be performed in a band to which listening is applied.

BRIEF DESCRIPTION OF DRAWINGS

FIGS. 1A to 1C are diagrams illustrating examples of multiplexing patterns.

FIG. 2 is a diagram illustrating an example of a search space configuration table for FR1 and multiplexing pattern 1.

FIGS. 3A and 3B are diagrams illustrating an example of a search space configuration for FR1 and multiplexing pattern 1.

FIGS. 4A and 4B are diagrams illustrating another example of a search space configuration for FR1 and multiplexing pattern 1.

FIG. 5 is a diagram illustrating an example of a search space configuration for multiplexing pattern 2 (SSB SCS=120 kHz and RMSI SCS=60 kHz).

FIG. 11 is a diagram illustrating an example of a CORESET configuration table when SSB SCS and RMSI SCS are 15 kHz.

FIG. 12 is a diagram illustrating an example of a CORESET configuration table when SSB SCS and RMSI SCS are 30 kHz.

FIG. 13 is a diagram illustrating an example of a synchronization raster.

FIGS. 14A and 14B are diagrams illustrating multiplexing according to aspect 1-2.

DESCRIPTION OF EMBODIMENTS

<Unlicensed Band>

Figure 6:
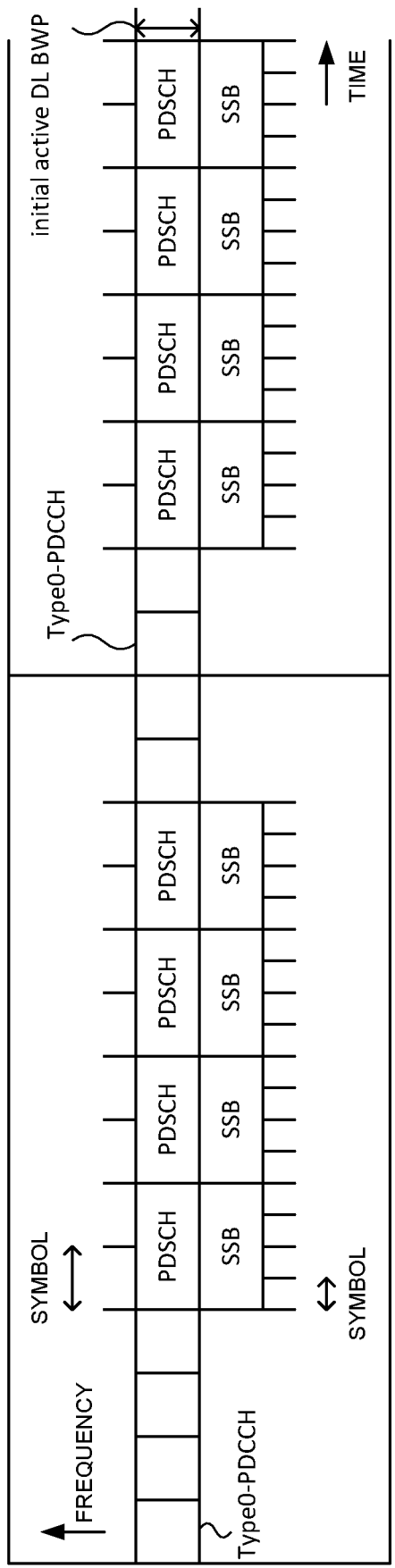
FIGS. 6A and 6B are diagrams illustrating an example of a search space configuration for multiplexing pattern 2 (SSB SCS=240 kHz and RMSI SCS=120 kHz).

In the unlicensed band (for example, 2.4 GHz band or 5 GHz band), it is assumed that a plurality of systems such as a Wi-Fi system and a system supporting LAA (LAA system) coexist. Therefore, it is necessary to avoid collision of transmissions and/or control interference between the plurality of systems.

For example, a Wi-Fi system using an unlicensed band employs CSMA (Carrier Sense Multiple Access)/CA (Collision Avoidance) for the purpose of collision avoidance and/or interference control. In the CSMA/CA, a predetermined time (DIFS (Distributed access Inter Frame Space)) is provided before transmission, and a transmitting apparatus transmits data after confirming that there is no other transmission signal (carrier sense). After transmitting the data, the transmitting apparatus waits for ACK (ACKnowledgement) from a receiving apparatus. If the transmitting apparatus cannot receive the ACK within the given time, the transmitting apparatus determines that a collision has occurred and performs retransmission.

In LAA of the existing LTE system (for example, Rel. 13), a transmitting apparatus of data performs listening (also referred to as listen before talk (LBT), clear channel assessment (CCA), "carrier sense", "channel access procedure", and so on) for confirming the presence or absence of transmission of other pieces of apparatus (for example, base station, user terminal, Wi-Fi device, and so on) before transmission of data in the unlicensed band.

The transmitting apparatus may be, for example, a base station (for example, gNB (gNodeB)) in the downlink (DL) and a user terminal (for example, UE (User Equipment)) in the uplink (UL). Further, the receiving apparatus that receives data from the transmitting apparatus may be, for example, a user terminal in DL and a base station in UL.

In the LAA of the existing LTE system, the transmitting apparatus starts data transmission after a given period (for example, immediately or a backoff period) after it is detected that there is no transmission of other pieces of apparatus in the LBT (idle state).

The following four categories are defined as channel access methods in LTE LAA.

Category 1: A node performs transmission without performing LBT.

Category 2: A node performs carrier sense in a fixed sensing time before transmission and performs transmission when a channel is idle.

Category 3: A node randomly generates a value (random backoff) within a given range before transmission, repeats carrier sense at a fixed sensing slot time, and performs transmission when it can be confirmed that a channel is idle over a slot of the value.

Category 4: A node randomly generates a value (random backoff) within a given range before transmission, repeats carrier sense at a fixed sensing slot time, and performs transmission when it can be confirmed that a channel is idle over a slot of the value. The node changes a range of a random backoff value (contention window size) according to a communication failure situation due to a collision with communication of another system.

As an LBT regulation, it is being studied to perform LBT according to a length of a gap between two transmissions (a non-transmission period, a period in which received power is a given threshold value or less, or the like).

An LAA system using NR may be referred to as an NR-U (Unlicensed) system, an NR LAA system, or the like. In the NR-U system, a base station (gNB) or a UE obtains a transmission opportunity (TxOP) and performs transmission when an LBT result is idle. A time of the transmission opportunity is referred to as a channel occupancy time (COT).

It is being studied that NR-U (Unlicensed) uses a signal including at least SS (Synchronization Signal)/PBCH (Physical Broadcast CHannel) block (SS block: SSB). The following are being studied in an unlicensed band operation using this signal.

There is no gap within a time range in which the signal is transmitted within at least one beam An occupied bandwidth is satisfied A channel occupancy time of the signal is minimized Characteristics that facilitate a quick channel access In addition, a signal including CSI (Channel State Information)-RS (Reference Signal), an SSB block burst set (set of SSB), and CORESET (COntrol REsource SET) and PDSCH associated with SSB in one continuous burst signal is being studied. This signal may be referred to as a discovery reference signal (DRS, NR-U DRS, or the like). The CORESET associated with the SSB may be referred to as a remaining minimum system information (RMSI)

CORESET, CORESET #0, or the like. RMSI may be referred to as system information block 1 (SIB1). The PDSCH associated with the SSB may be PDSCH (RMSI PDSCH) that carries the RMSI.

SSBs having different SSB indexes and RMSI PDSCHs and RMSI PDSCHs corresponding to the SSBs may be transmitted using different beams.

<Restriction in NR-U>

A node (for example, a base station or a UE) in NR-U confirms that a channel is idle by listen before talk (LBT) for coexistence with other systems or other operators, and then starts transmission.

After success of the LBT, the node may continue the transmission for a certain period after starting the transmission. However, when the transmission is interrupted for a given gap period or more in the middle, there is a possibility that another system is using the channel, and the LBT is thus required again before the next transmission. A period in which the transmission can be continued depends on a priority class in the LBT. The priority class may be a contention window size for random backoff, or the like. The shorter the LBT period (the higher the priority class), the shorter the period in which the transmission can be continued.

The node needs to perform the transmission in a wide band according to a transmission bandwidth regulation in the unlicensed band. For example, a transmission bandwidth regulation in Europe is 80% or more of a system bandwidth. Narrowband transmissions can collide with each other without being detected by other systems or other operators performing the LBT in a wide band.

It is preferable that the node performs the transmission in as short a time as possible. By shortening a channel occupancy time of each of a plurality of systems that coexist, the plurality of systems can efficiently share resources with each other.

<Request for SSB/RMSI (DRS) Transmission in NR-U>

It is preferable that the base station in NR-U transmits RMSI PDCCH (PDCCH for scheduling RMSI (SIB1)) and RMSI PDSCH (PDSCH carrying RMSI) associated with SSBs of different beams (beam indexes) using as wide a band as possible within as short a time as possible. As a result, the base station can apply a high priority class (short LBT period) to SSB/RMSI (DRS) transmission, and can be expect that the LBT will succeed with high probability. The base station easily satisfies the transmission bandwidth regulation by performing the transmission in a wide band. In addition, the base station can avoid interruption of the transmission by performing the transmission in a short time.

It is being studied to set a bandwidth of an initial active DL BWP for NR-U to 20 MHz. This is because a channel bandwidth of Wi-Fi, which is a coexistence system, is 20 MHz. In this case, SSB, RMSI PDCCH, and RMSI PDSCH need to be included in a 20 MHz bandwidth.

<Multiplexing Pattern>

In Rel. 15, multiplexing patterns 1 to 3 for SSB and RMSI are defined.

Multiplexing pattern 1: SSB and RMSI PDCCH CORESET (CORESET including RMSI PDCCH, CORESET #0) are time-division-multiplexed (TDM) (FIG. 1A).

In a band with a narrow channel bandwidth, when SSB and CORESET cannot be frequency-division-multiplexed (FDM), it is effective that the SSB and the CORESET are time-division-multiplexed (TDM). When a plurality of beams can be transmitted at the same frequency and in the same time by digital beamforming in a low frequency band (for example, frequency range (FR)1, 6 GHz or less), it is not necessary to perform FDM with the same beam.

Multiplexing pattern 2: SSB and RMSI PDCCH CORESET are time-division-multiplexed (TDM) and frequency-division-multiplexed (FDM) (FIG. 1B).

When SSB SCS (SubCarrier Spacing (SCS) of SSB) and RMSI SCS (SCS of RMSI) are different from each other, particularly when the SSB SCS is wider than the RMSI SCS, a time length (symbol length) of SSB becomes short, and thus, it may not become possible to frequency-division-multiplex (FDM) both of RMSI PDCCH and RMSI PDSCH with the SSB. In this case, the SSB and the RMSI PDCCH CORESET can be multiplexed on different time resources and different frequency resources.

The base station can transmit only one beam when there is a restriction to use analog beamforming. The base station can transmit one beam in a short time and suppress an overhead of beam sweeping by frequency-division-multiplexing (FDM) the RMSI PDSCH with the SSB.

Multiplexing pattern 3: SSB and RMSI PDCCH CORESET are frequency-division-multiplexed (FDM) (FIG. 1C).

The base station can transmit one beam in a short time by frequency-division-multiplexing (FDM) both of RMSI PDCCH and RMSI PDSCH with the SSB. The base station can suppress an overhead of beam sweeping by switching the beam for each SSB.

<Multiplexing Pattern 1>

In Rel. 15, an RMSI PDCCH (Type0-PDCCH common search space, search space #0) monitoring occasion for multiplexing pattern 1 and FR1 is defined as in a search space configuration table of FIG. 2. Only multiplexing pattern 1 is defined in FR1. The UE uses a search space configuration (PDCCH monitoring occasion) corresponding to an index (search space configuration index) provided in notification by a master information block (MIB, lower 4 bits of pdcch-ConfigSIB1 in the MIB).

For multiplexing pattern 1, the UE monitors PDCCH in a type0-PDCCH common search space that spans two consecutive slots starting at slot no. For SSB having an SSB index i, the UE determines a slot index no positioned in a frame having a system frame number (SFN) $SFN_c$ by the following Equation.

$$n_0 = (O \cdot 2^\mu + \lfloor i \cdot M \rfloor) \bmod N_{slot}^{frame,\mu}$$

$$SFN_C \bmod 2 = 0 \text{ if } \lfloor (O \cdot 2^\mu + \lfloor i \cdot M \rfloor)/N_{slot}^{frame,\mu} \rfloor \bmod 2 = 0$$

$$SFN_C \bmod 2 = 1 \text{ if } \lfloor (O \cdot 2^\mu + \lfloor i \cdot M \rfloor)/N_{slot}^{frame,\mu} \rfloor \bmod 2 = 1$$

[Math. 1]

In this search space configuration table, O is an offset [ms] from a slot including head SSB (SSB index 0) to a slot including the corresponding RMSI PDCCH CORESET. M is a reciprocal of the number of search space sets per slot. $\mu \in \{0,1,2,3\}$ is based on SCS (RMSI SCS) used for PDCCH reception in CORESET. A head symbol index is an index of a head symbol of CORESET in slot nC. It is assumed that the number of SSBs per slot is 2.

Flexibility of scheduling can be increased by allowing the UE to monitor a search space set corresponding to one SSB over two slots.

FIGS. 3A, 3B, 4A, and 4B illustrate a case where RMSI SCS is 30 kHz and a slot length is 0.5 ms.

As illustrated in FIG. 3A, when the search space configuration index is 0, the number of search space sets per slot is 1, M is 1, and the head symbol index is 0. It is assumed that a type0-PDCCH common search space for RMSI #0 corresponding to SSB #0 in slot #0 spans two consecutive slots #0 and #1 and PDCCH and PDSCH for RMSI #0 are scheduled in slot #0 of the two consecutive slots #0 and #1. Since the number of search space sets per slot is 1, it is assumed that a type0-PDCCH common search space for RMSI #1 corresponding to SSB #1 in slot #0 spans the next slots #1 and #2 and PDCCH and PDSCH for RMSI #1 are scheduled in slot #1 of the next slots #1 and #2. As such, a relative position of the slot of RMSI to the slot of SSB changes.

As illustrated in FIG. 3B, when the search space configuration index is 1, the number of search space sets per slot is 2, and two search spaces (PDCCH) each corresponding to two SSBs can thus be arranged in one slot. A head symbol index of the search space is 0 in an even SSB index, and an odd SSB index is an offset symbol of the number of symbols of CORESET. In this example, two RMSI PDCCHs corresponding to the two SSBs transmitted in one slot are transmitted at the head of the slot, and two RMSI PDSCHs corresponding to the two SSBs are frequency-division-multiplexed (FDM) in the slot. That is, the SSBs and the RMSI PDCCHs and the RMSI PDSCHs corresponding to the SSBs are transmitted in the same slot.

As illustrated in FIG. 4A, when the search space configuration index is 2, there is an offset of 2 ms from a start slot of head SSB to a start slot of the corresponding RMSI PDCCH. Contents other than those described above are the same as those when the search space configuration index is 0.

As illustrated in FIG. 4B, when the search space configuration index is 3, there is an offset of 2 ms from a start slot of head SSB to a start slot of the corresponding RMSI PDCCH. Contents other than those described above are the same as those when the search space configuration index is 1.

<Multiplexing Patterns 2 and 3>

In Rel. 15, multiplexing patterns 2 and 3 are defined in addition to multiplexing pattern 1 for FR2. Multiplexing pattern 2 is used only in a case where SSB SCS and RMSI SCS are different from each other. Multiplexing pattern 3 is used only in a case where SSB SCS and RMSI SCS are the same as each other.

For an RMSI PDCCH monitoring occasion for multiplexing pattern 2 and SSB SCS=120 kHz and RMSI SCS=60 kHz, only a search space configuration when a search space configuration index is 0 is defined as in a search space configuration table in FIG. 5.

For an RMSI PDCCH monitoring occasion for multiplexing pattern 2 and SSB SCS=240 kHz and RMSI SCS=120 kHz, only a search space configuration when a search space configuration index is 0 is defined as in a search space configuration table in FIG. 6B.

As illustrated in FIG. 6A, SSBs #0 to #7, corresponding RMSI PDCCHs #0 to #7, and corresponding RMSI PDSCHs #0 to #7 are arranged over two consecutive slots. SSBs #0 to #7 and the respective corresponding RMSI PDSCHs #0 to #7 are frequency-division-multiplexed (FDM). SSBs #0 to #7 and the respective corresponding RMSI PDCCHs #0 to #7 are time-division-multiplexed (TDM) and frequency-division-multiplexed (FDM). RMSI PDCCHs #0 to #7 and RMSI PDSCHs #0 to #7 are arranged in an initial active DL BWP, and SSBs #0 to #7 are arranged outside the initial active DL BWP. A time length of CORESET in this case is one symbol and is arranged according to a search space configuration in FIG. 6B.

The RMSI PDSCH is scheduled by the RMSI PDCCH and may not use resources as illustrated in this drawing. When there is a restriction of analog beamforming, it is preferred that the corresponding PDSCH is scheduled within a period of the SSB, as illustrated in this drawing.

Figure 7:
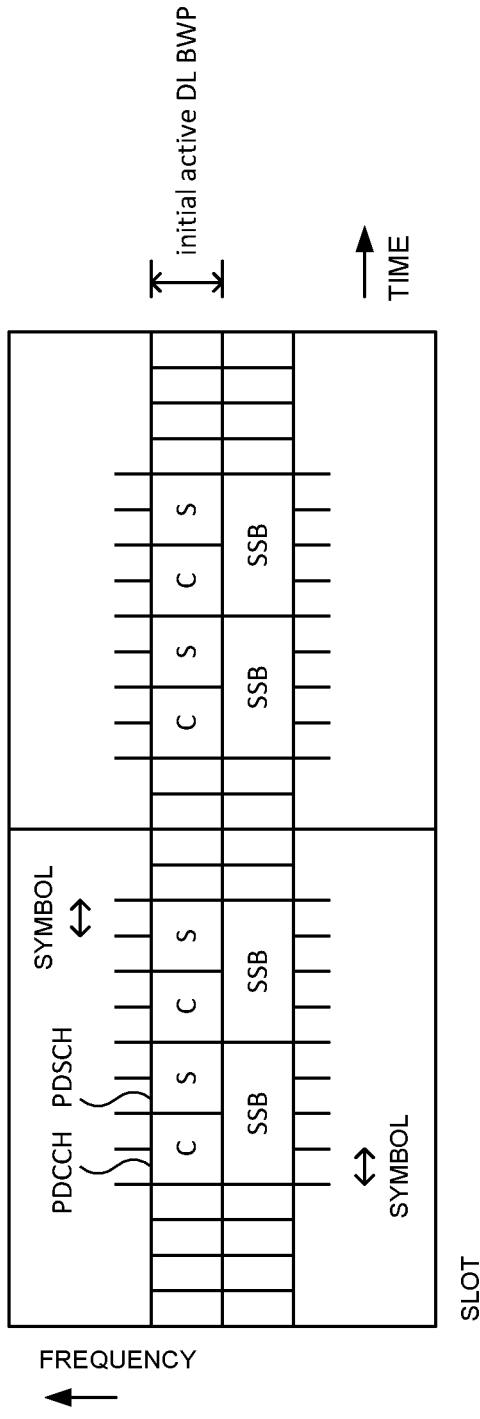
FIGS. 7A and 7B are diagrams illustrating an example of a search space configuration for multiplexing pattern 3 (SSB SCS=RMSI SCS=120 kHz).

For an RMSI PDCCH monitoring occasion for multiplexing pattern 3 and SSB SCS=RMSI SCS=120 kHz, only a search space configuration when a search space configuration index is 0 is defined as in a search space configuration table in FIG. 7B.

As illustrated in FIG. 7A, SSBs #0 to #3, corresponding RMSI PDCCHs #0 to #3, and corresponding RMSI PDSCHs #0 to #3 are arranged over two consecutive slots. SSBs #0 to #3 and the respective corresponding RMSI PDSCHs #0 to #3 are frequency-division-multiplexed (FDM). SSBs #0 to #3 and the respective corresponding RMSI PDCCHs #0 to #3 are frequency-division-multiplexed (FDM). RMSI PDCCHs #0 to #3 and RMSI PDSCHs #0 to #3 are arranged in an initial active DL BWP, and SSBs #0 to #3 are arranged outside the initial active DL BWP. A time length of CORESET in this case is two symbols and is arranged according to a search space configuration in FIG. 7B.

The RMSI PDSCH is scheduled by the RMSI PDCCH and may not use resources as illustrated in this drawing. When there is a restriction of analog beamforming, it is preferred that the corresponding PDCCH and PDSCH are scheduled within a period of the SSB, as illustrated in this drawing.

<Problem>

In such multiplexing patterns, the following problems can be considered.

In Rel. 15, only multiplexing pattern 1 is defined for FR1. There is a possibility that a pattern in which SSB and RMSI PDSCH and RMSI PDSCH are time-division-multiplexed (TDM) (arranged in different slots) will not be valid for NR-U.

For example, when SSB SCS is any one of 15, 30, and 60 kHz, a bandwidth (20 PRB) of a period in which only the SSB is transmitted is any one of 3.6, 7.2, and 14.4 MHz, and thus, does not occupy 80% (16 MHz) of a 20 MHz bandwidth and does not satisfy a transmission bandwidth regulation. Therefore, it is necessary to frequency-division-multiplex (FDM) the SSB and other signals.

Since RMSI is transmitted periodically even when there is no user data, it is preferable to make it possible to frequency-division-multiplex (FDM) the RMSI and the SSB so that the transmission bandwidth regulation can be satisfied regardless of the presence/absence of the user data.

In addition, for example, when a gap is generated between a slot including the SSB and a slot including the RMSI PDCCH and the RMSI PDSCH, the base station needs to perform LBT again after the gap.

Figure 8:
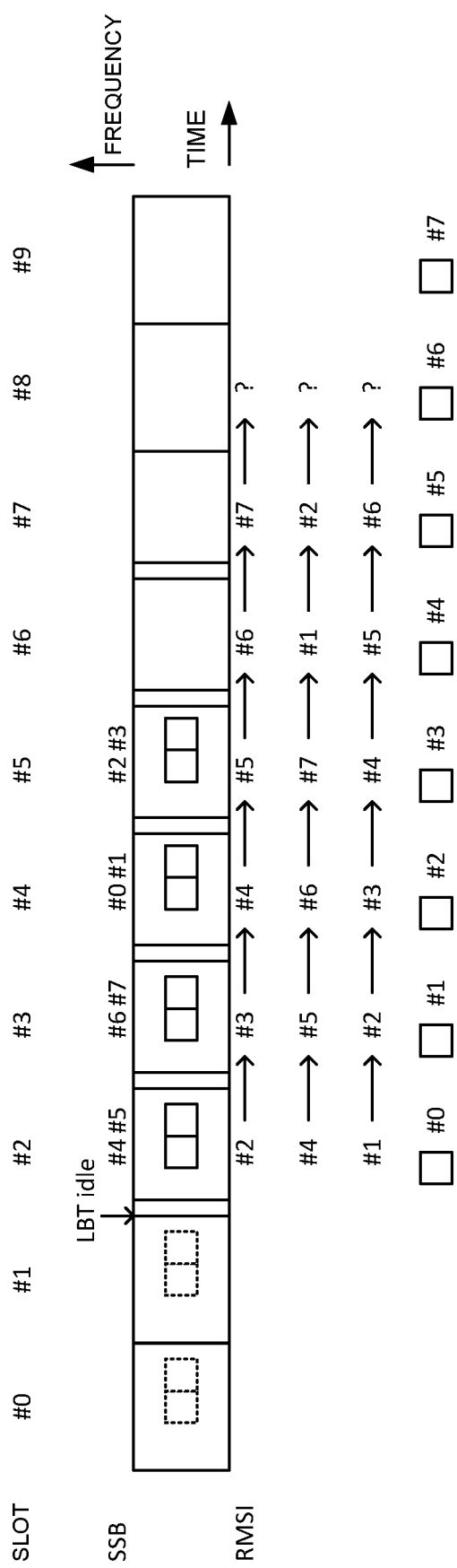
FIG. 8 is a diagram illustrating an example of a case where a relative position between a slot of SSB and a slot of RMSI changes according to an SSB index.

As illustrated in FIG. 8, in a case of frequency-division-multiplexing (FDM) SSB and RMSI PDSCH (for example, a case where a search space configuration index is 0), a relative position between a slot of the SSB and a slot of the RMSI changes according to an SSB index. In this case, a case where transmission is impossible at some of SSB transmission candidate positions due to LBT busy and transmission becomes possible from the middle of the SSB transmission candidate positions due to the subsequent LBT idle is conceivable. In this case, association between SSB and RMSI is not clear. It is being studied to increase the transmission candidate positions of the SSB to send the SSB that could not be sent due to the LBT busy later, but in this case, it is not clear how to send the RMSI.

In a case where the slot of the SSB and the slot of the RMSI are the same as each other (for example, the search space configuration index is 1), a case where transmission is impossible at some of the SSB transmission candidate positions due to the LBT busy and transmission becomes possible from the middle of the SSB transmission candidate positions due to the subsequent LBT idle is conceivable.

In this case, it is conceivable that an operation such as an operation of transmitting the corresponding RMSI in a slot for transmitting the SSB becomes easy. However, since the search space configuration index corresponding to a case where the slot of the SSB and the slot of the RMSI are different cannot be used, some bits of MIB (pdcch-ConfigSIB1) become useless.

Figure 9:
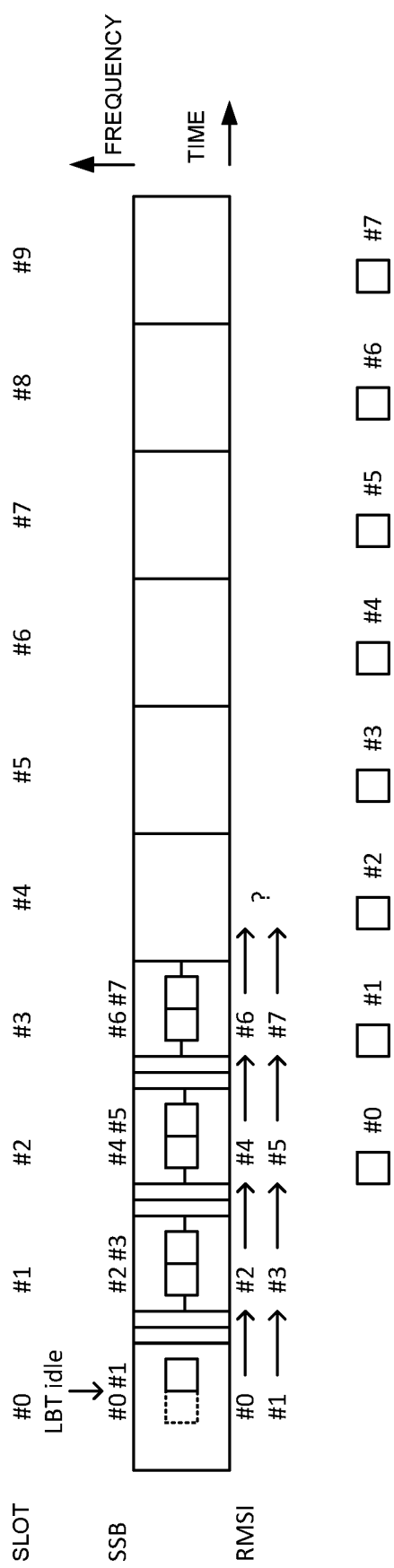
FIG. 9 is a diagram illustrating an example of a case where the slot of the SSB and the slot of the RMSI are the same as each other.

In this case, when head PDCCH of the slot is not transmitted due to LBT busy and transmission is started from the middle of the slot according to LBT idle (when some of SSB, PDCCH, and PDSCH in the slot are transmitted), association between SSB and RMSI is not clear as illustrated in FIG. 9, similar to the case where the search space configuration index is 0 described above.

In Rel. 15, multiplexing pattern 3 in FR1 is not supported, but when multiplexing pattern 3 in FR1 is supported, SSB and RMSI PDCCH or RMSI PDSCH can be frequency-division multiplexed (FDM). That is, if the SSB is transmitted, the RMSI PDCCH is also transmitted. When transmission is impossible at some of the SSB transmission candidate positions due to LBT busy and transmission becomes possible due to the subsequent LBT idle, the base station can perform transmission start with a finer granularity (SSB unit) than a slot.

Figure 10:
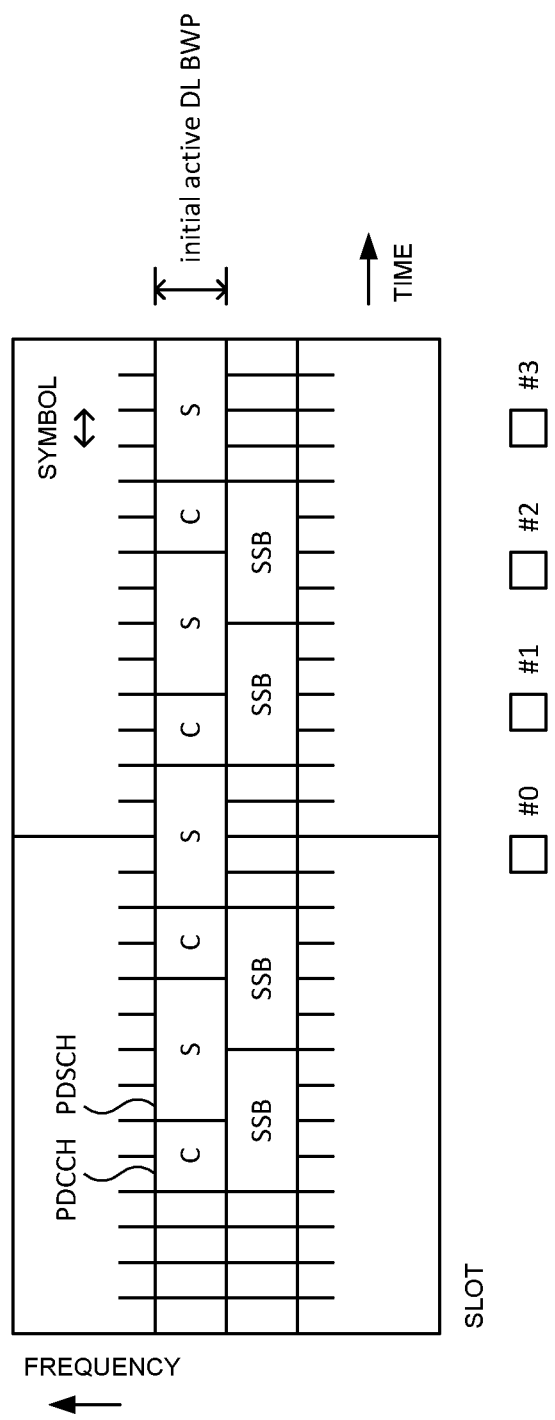
FIG. 10 is a diagram illustrating an example of a case where a gap between SSBs is filled with a physical downlink shared channel (PDSCH).

In multiplexing pattern 3, if a band of SSB and an initial active DL BWP (band of RMSI CORESET and bands of RMSI PDCCH and RMSI PDSCH) are frequency-division multiplexed (FDM), a period in which the SSB is not transmitted may become a gap. In this case, as illustrated in FIG. 10, it is conceivable to fill the gap with a signal such as PDSCH or the like. However, it is conceivable that a transmission bandwidth becomes narrower than 80% of a 20 MHz bandwidth, such that a transmission bandwidth regulation is not satisfied only with the band of the PDSCH.

When a CORESET configuration table indicating a configuration of RMSI CORESET when SSB SCS and RMSI SCS are 15 kHz as illustrated in FIG. 11 and a CORESET configuration table when SSB SCS and RMSI SCS are 30 kHz as illustrated in FIG. 12 are defined, if a spacing of a synchronization raster changes, a PRB offset of the SSB and a PRB offset of the RMSI need to be changed. In order for RMSI PDCCH to satisfy the transmission bandwidth regulation (occupy 80% or more of the 20 MHz bandwidth), when the RMSI SCS is 15 kHz, it is necessary to use CORESET whose number of RBs is 96, and when the RMSI SCS is 30 kHz, it is necessary to use CORESET whose number of RBs is 48. In this case, some bits of an entry in a CORESET configuration table and MIB (pdcch-ConfigSIB1) become useless.

As described above, the multiplexing pattern for an NR-U target frequency (unlicensed band) is not clear. If an appropriate multiplexing pattern is not used, there is a risk that performance deterioration of an own system or other systems will be caused.

Therefore, the present inventors have conceived a PDCCH monitoring operation for an unlicensed band. The UE may determine resources of RMSI PDCCH in a licensed band using a determination method different from a determination method of resources of RMSI PDCCH in the unlicensed band.

As a result, SSB and RMSI can be continuously transmitted in a wide band and in a short time, such that it is possible to realize stable obtainment of a transmission opportunity of the SSB and the RMSI, efficient coexistence with other systems, improvement of frequency utilization efficiency, and the like.

Hereinafter, embodiments according to the present disclosure will be described in detail with reference to the drawings. The radio communication method according to each of the embodiments may be applied independently, or may be applied in combination with others.

In the present disclosure, an NR-U target frequency may be replaced with a carrier (cell, CC), LAA SCell, an LAA cell, a primary cell (PCell, Special Cell: SpCell), a secondary cell (SCell), and the like, in a first frequency band (unlicensed band, unlicensed spectrum). In addition, an NR target frequency may be replaced with a carrier (cell, CC), PCell, SCell, a non-NR-U target frequency, and the like, in a second frequency band (licensed band, license spectrum). Different frame structures may be used at the NR-U target frequency and the NR target frequency.

The radio communication system (NR-U, LAA system) may comply with (support) a first radio communication standard (for example, NR, LTE, or the like).

Other systems that coexist with this radio communication system (coexistence system, coexistence apparatus) and other radio communication devices (coexistence apparatus) may comply with (support) a second radio communication standard, which is different from the first radio communication standard, such as Wi-Fi, Bluetooth (registered trademark), WiGig (registered trademark), wireless LAN (Local Area Network), IEEE802.11, LPWA (Low Power Wide Area), etc. The coexistence system may be a system that receives interference from the radio communication system or a system that gives interference to the radio communication system. SSB, RMSI PDCCH (RMSI CORESET), and RMSI PDSCH may be replaced with DRS (NR-U DRS).

(Radio Communication Method)
<Aspect 1>

At an NR-U target frequency (unlicensed band), an interpretation of a specific field for CORESET #0 (ControlResourceSetZero, CORESET for type0-PDCCH) and search space #0 (SearchSpaceZero, type0-PDCCH monitoring occasion) may be different from an interpretation at an NR-U target frequency (licensed band).

The specific field may be a specific field (pdcch-ConfigSIB1) in the MIB in the PBCH included in the SSB. The specific field (pdcch-ConfigSIB1) may be replaced with PDCCH-ConfigCommon (controlResourceSetZero and searchSpaceZero) provided in notification to the UE by RRC signaling.

For the specific field, at least one of the following aspects 1-1 to 1-3 may be used.

<Aspect 1-1>

A CORESET configuration based on ControlResourceSetZero (upper four bits of pdcch-ConfigSIB1, CORESET configuration index) at the NR-U target frequency will be described.

One default SSB SCS may be defined in a specification for the NR-U target frequency. The default SSB CSC may be 30 kHz. A plurality of candidates (for example, 15 kHz and 30 kHz) for RMSI SCS may be defined. In this case, a CORESET configuration table for the NR-U target frequency may be defined for a combination of the default SSB CSC and the RMSI SCS.

Meanwhile, a plurality of candidates for SSB SCS may be defined for an NR target frequency. A CORESET configuration table for the NR-U target frequency may be defined for a combination of the SSB CSC and the RMSI SCS. By defining one default SSB SCS for the NR-U target frequency, the number of CORESET configuration tables for the NR-U target frequency can be made to be less than the number of CORESET configuration tables for the NR target frequency.

In order to satisfy the transmission bandwidth regulation (80% or more of the 20 MHz bandwidth), a candidate for the number of RBs of CORESET #0 for multiplexing pattern 1 when RMSI SCS is 30 kHz is only 48 (or 48 or more). The candidate for the number of RBs of CORESET #0 for multiplexing pattern 1 when the RMSI SCS is 15 kHz may be only 96 (or 96 or more).

A synchronization raster for the NR-U target frequency may be different from a synchronization raster for the NR target frequency. The synchronization raster for the NR target frequency may be defined as illustrated in FIG. 13. An interval between the synchronization rasters for the NR target frequency is, for example, 1.44 MHz in a frequency band of 3 GHz or more.

When a channel bandwidth of 20 MHz or more is used at the NR-U target frequency, the interval between the synchronization rasters for the NR-U target frequency may be wider than an interval between the synchronization rasters for the NR target frequency. For example, the interval between the synchronization rasters for the NR-U target frequency may be wider than 1.44 MHz or be 20 MHz in the frequency band of 3 GHz or more. Depending on the interval between the synchronization rasters, an offset in a CORESET configuration for the NR-U target frequency (RB offset, PRB of the lowest frequency of CORESET) may be larger than an offset in a CORESET configuration for the NR target frequency.

<Aspect 1-2>

A search space configuration based on SearchSpaceZero (lower four bits of pdcch-ConfigSIB1, search space configuration index at the NR-U target frequency will be described.

Multiplexing pattern 3 for the NR-U target frequency may be supported. The base station may frequency-division-multiplex (FDM) the RMSI PDCCH with at least some symbols in the SSB.

The base station may transmit both of SSB that could not be sent at a transmission candidate position due to LBT busy and RMSI PDCCH corresponding to the SSB at different transmission candidate positions.

As illustrated in FIG. 14A, the base station may schedule RMSI PDSCH in a gap between SSBs in a case of using multiplexing pattern 3 of the NR-U target frequency. The base station may schedule the RMSI PDSCH within a band including SSB and CORESET #0. The base station may schedule the RMSI PDSCH straddling a boundary between slots. The base station may schedule the RMSI PDSCH over a CORESET band and an SSB band. The base station may schedule the RMSI PDSCH straddling a boundary between periods of the SSBs. For example, the base station may schedule RMSI PDSCH #0 in a period straddling a boundary between SSBs #0 and #1 or may schedule RMSI PDSCH #2 in a period straddling a boundary between SSBs #2 and #3. As illustrated in this drawing, the SSB may be four symbols, the RMSI CORESET may be two symbols, and the RMSI PDSCH may be four symbols. The CORESET band may be in an initial active DL BWP or the CORESET band and the SSB band may be in the initial active DL BWP.

As illustrated in FIG. 14A, two transmission candidate positions of the SSB (head symbol of candidate SSB, SSB mapping pattern) may be consecutive. For example, a case may be defined as case B, SSB SCS may be 30 kHz, and head symbols of SSBs for every two consecutive slots (symbols #0 to #27) may be symbols #4, #8, #16, and #20.

As illustrated in FIG. 14B, transmission candidate positions of SSB may be separated from each other. For example, a case may be defined as case C, SSB SCS may be 30 kHz, and head symbols of SSBs for every one slot (symbols #0 to #13) may be symbols #2 and #8. The base station may arrange at least one of RMSI PDCCH and RMSI PDSCH in a gap between the SSBs in a case of using case C and multiplexing pattern 1. The base station may arrange the corresponding RMSI PDCCH in the gap in front of the SSB. The base station may schedule the corresponding RMSI PDSCH by frequency-division-multiplexing (FDM) the RMSI PDSCH with the SSB. The base station may schedule the SSB and the RMSI PDSCH within a band of CORESET #0. The base station may schedule the corresponding RMSI PDSCH from a period of the SSB to a subsequent gap. For example, the base station may schedule RMSI PDSCH #1 in a period straddling a boundary of an end point of SSB #1 or may schedule RMSI PDSCH #3 in a period straddling a boundary of an end point of SSB #3. The base station may transmit a given signal other than the RMSI PDSCH over an RMSI CORESET band and an SSB band in a gap after the last SSB of the slot. The CORESET band may be in an initial active DL BWP or the CORESET band and the SSB band may be in the initial active DL BWP.

<Aspect 1-3>

A bit size of a specific field for at least one of CORESET #0 and search space #0 for the NR-U target frequency (at least one of upper four bits and lower four bits of pdcch-ConfigSIB1, at least one of controlResourceSetZero and searchSpaceZero in PDCCH-ConfigCommon) may be smaller than a bit size of a specific field for the NR target frequency.

A CORESET configuration table for the NR-U target frequency may be defined separately from a CORESET configuration table for the NR target frequency. The CORESET configuration table for the NR-U target frequency may indicate a configuration of aspect 1-1. Bits of a specific field for CORESET #0 remain, such that the remaining bits may be used for another purpose.

A search space configuration table for the NR-U target frequency may be defined separately from a search space configuration table for the NR target frequency. The search space configuration table for the NR-U target frequency may indicate a configuration of aspect 1-2. Bits of a specific field for search space #0 remain, such that the remaining bits may be used for another purpose.

As another purpose, the remaining bits may be information regarding whether they are an original transmission candidate position of the SSB (transmission position in SSB index order) or a changed transmission candidate position. For example, when an SSB transmission candidate position is expanded (increased), an SSB having a certain SSB index is not transmitted according to LBT busy, and an SSB having the same SSB index at another SSB transmission candidate position is transmitted according to LBT idle, the remaining bits may indicate whether the transmitted SSB has been transmitted at the original transmission candidate position or has been transmitted at the changed transmission candidate position.

There is a case where the UE performing initial access cannot recognize a head of a frame. The remaining bits indicate whether or not they are the original transmission candidate position of the SSB, such that the UE can recognize the head of the frame based on the received SSB and can correctly recognize the position of the SSB.

A bit size of a specific field for the NR-U target frequency may be the same as a bit size of a specific field for the NR target frequency. In this case, an interpretation of a given index indicated by the specific field for the NR-U target frequency may be different from an interpretation of a given index indicated by the specific field for the NR target frequency.

When some (configuration table) of the CORESET configuration table and the search space configuration table for the NR target frequency is also used for the NR-U target frequency, the UE may assume that a specific index in the configuration table is not indicated. For example, the specific index may indicate a configuration in which a CORESET bandwidth does not satisfy the transmission bandwidth regulation (is less than 80% of the 20 MHz bandwidth) among a plurality of configurations in a CORESET #0 table.

When the specific index is indicated at the NR-U target frequency, the UE may make an interpretation different from that when another index is indicated. For example, the UE may use a configuration of another index in the configuration table when the specific index is indicated at the NR-U target frequency. In this case, the UE may recognize information of another purpose by the specific index. For example, a multiplexing pattern used when the specific index has been indicated at the NR-U target frequency and a multiplexing pattern used when the specific index has been indicated at the NR-U target frequency may be different from each other. For example, the UE may use multiplexing pattern 1 when the specific index has been indicated at the NR-U target frequency and use multiplexing pattern 3 when the specific index has been indicated at the NR-U target frequency.

In this case, an operation appropriate for NR-U can be realized without changing the configuration table and the bit size of the specific field for the NR target frequency.

According to aspect 1, the UE can appropriately monitor the RMSI PDCCH at the NR-U target frequency.

<Aspect 2>

When RMSI PDCCH at a transmission candidate position based on a specific field (for example, pdcch-ConfigSIB1) is not transmitted due to LBT busy, it may be supported to transmit RMSI PDCCH at another transmission candidate position.

The UE may perform PDCCH monitoring according to at least one of aspects 2-1 and 2-2.

<Aspect 2-1>

When the slot of the SSB and the slot of the corresponding RMSI PDCCH are the same as each other as in FIGS. 9, 14A, and 14B, the UE may determine an RMSI PDCCH monitoring occasion according to a change in a transmission position of the RMSI PDCCH.

When a transmission position of the SSB changes according to LBT busy, the UE may assume that a PDCCH monitoring occasion is also changed.

Figure 15:
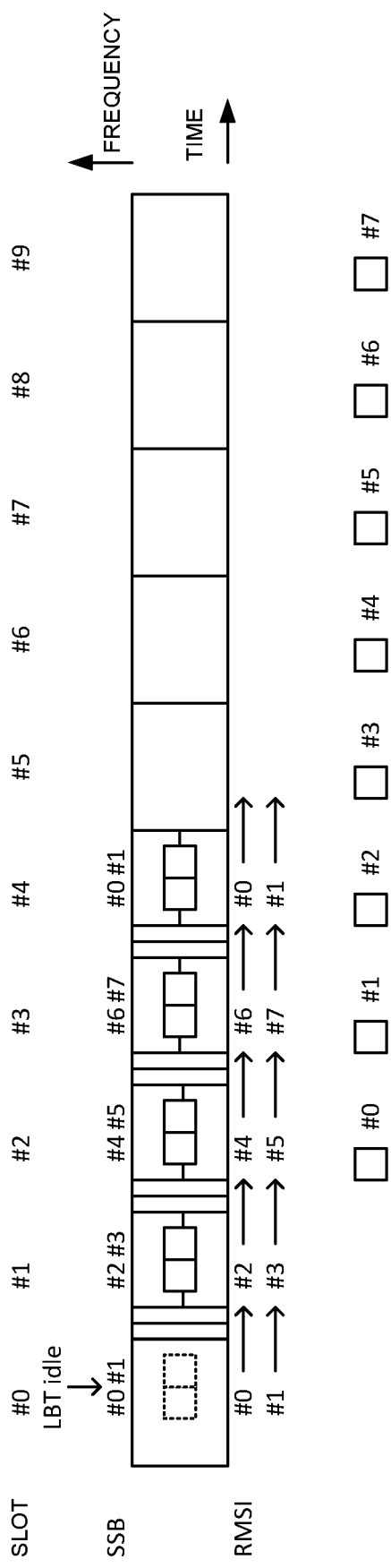
FIG. 15 is a diagram illustrating an example of a physical downlink control channel (PDCCH) monitoring operation when a slot of SSB and a slot of corresponding RMSI PDCCH are the same as each other.

When SSB #0 is not transmitted due to the LBT busy as illustrated in FIG. 9, even though a transmission candidate position of SSB #1 is LBT idle as illustrated in FIG. 15, it may be assumed that SSB #1 is not transmitted at an original transmission candidate position. In other words, the UE may assume that when a head SSB in a slot is not transmitted at an original transmission candidate position, another SSB in a slot is also not transmitted at an original transmission candidate position. In addition, the UE may assume that the SSB, the RMSI PDCCH, and the RMSI PDSCH are transmitted in slot units or may assume that transmission positions of the SSB, the RMSI PDCCH, and the RMSI PDSCH are changed in slot units.

<Aspect 2-2>

When a relative position (time distance) between an SSB transmission position (slot) and an RMSI PDCCH transmission position (slot) differs depending on an SSB index as illustrated in FIG. 8, the UE may determine an RMSI PDCCH monitoring occasion according to a change in a transmission position of the RMSI PDCCH.

The UE may recognize a PDCCH monitoring occasion according to the changed transmission position (or an SSB index, information regarding the transmission position, or the like).

Figure 16:
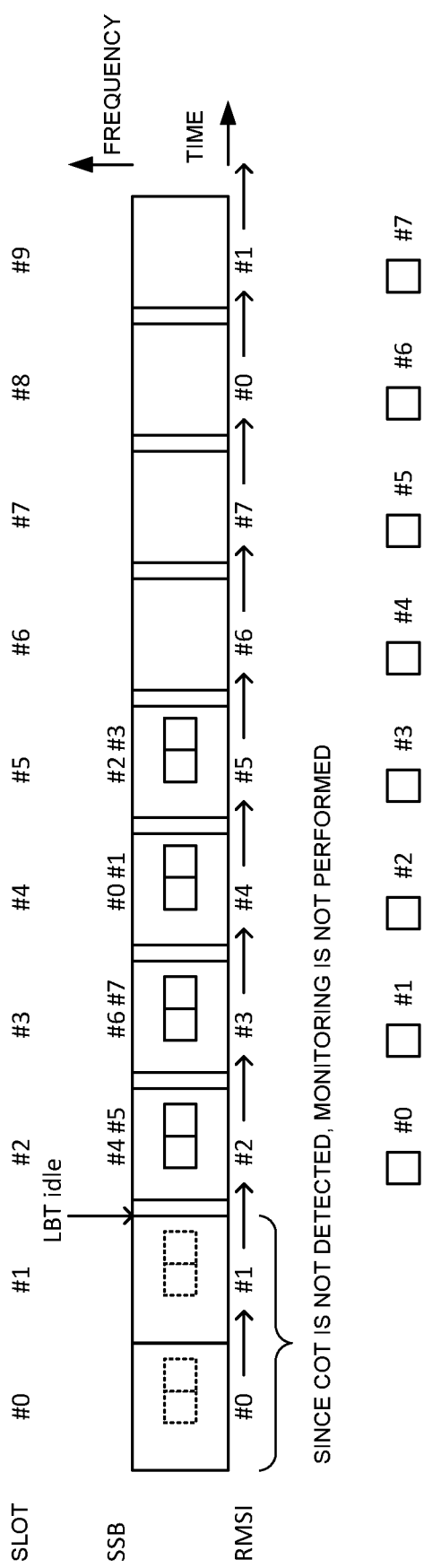
FIG. 16 is a diagram illustrating an example of a PDCCH monitoring operation when a relative position between an SSB transmission position and an RMSI PDCCH transmission position differs depending on an SSB index.

In this case, the base station may transmit any of the SSB, the RMSI PDCCH, and the RMSI PDSCH from a timing when transmission becomes possible (LBT idle) among the original transmission candidate positions. The base station may transmit the corresponding RMSI before the SSB in a case of transmitting the SSB from an SSB index in the middle. As illustrated in FIG. 16, the base station may transmit RMSI #2 and SSBs #4 and #5 according to LBT idle when it does not transmit SSBs #0 to #3 due to LBT busy. In addition, the base station may also transmit the corresponding SSB #2 in a slot after RMSI #2.

The UE may derive a transmission position of the RMSI PDCCH based on detection of a signal for recognizing a head of a COT. The signal may be a preamble. The preamble may be DCI common to the UE or may be a type of signal similar to a reference signal.

In an example of FIG. 16, the UE does not detect the preamble in slots #0 and #1, and thus, does not perform RMSI PDCCH monitoring. Thereafter, the UE detects the preamble in slot #2. In slot #2, RMSI #2 (PDCCH and PDSCH) is transmitted. The UE that has detected SSB #2 before then performs monitoring of PDCCH of RMSI #2. SSBs #4 to #7 are transmitted in slots #2 and #3, which are original transmission candidate positions. SSBs #0 to #3 that have not been transmitted due to LBT busy are transmitted in the following slots #4 and #5.

In a case where the SSB has not been transmitted at the original transmission candidate position due to the LBT busy, the UE may assume that a transmission position of the corresponding RMSI PDCCH is always changed. The UE may not recognize the head of the COT. The UE determines a transmission position (monitoring occasion) of the RMSI PDCCH based on the detected SSB. The UE may be notified of information regarding the SSB that has not been transmitted at the original transmission candidate position by the PBCH in the SSB. In this case, the UE may derive the corresponding RMSI PDCCH monitoring occasion based on the information provided in notification.

Figure 17:
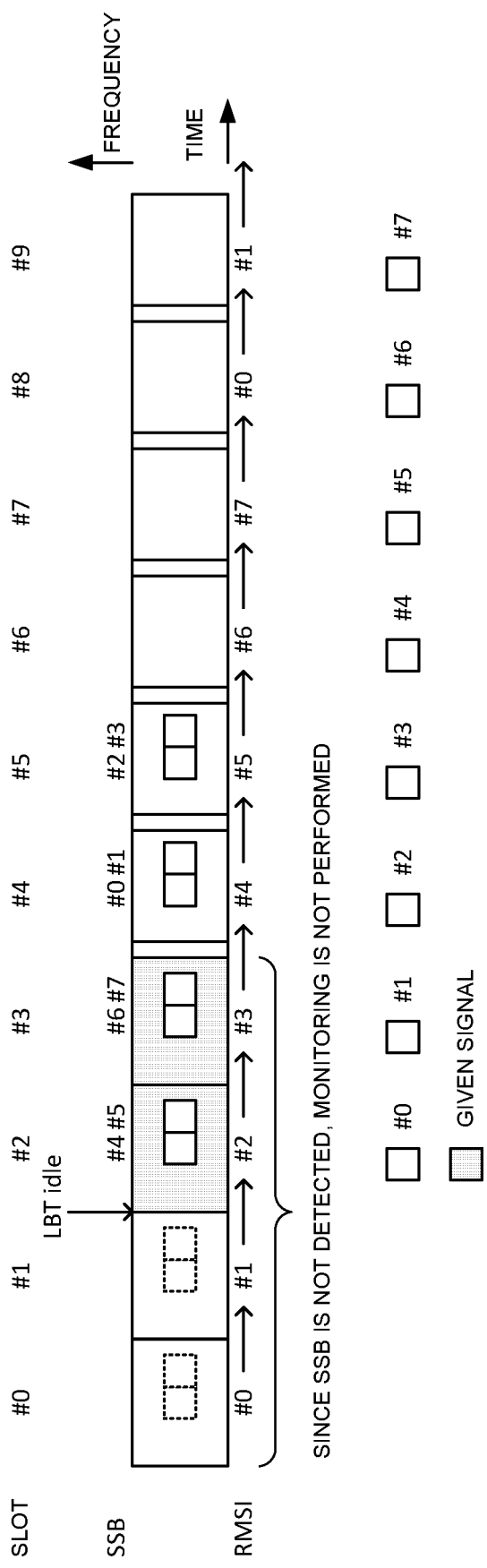
FIG. 17 is a diagram illustrating another example of a PDCCH monitoring operation when a relative position between an SSB transmission position and an RMSI PDCCH transmission position differs depending on an SSB index.

As illustrated in FIG. 17, SSBs #0 to #3 are not transmitted at original transmission candidate positions due to LBT busy, SSBs #4 to #7 are transmitted at original transmission candidate positions due to the subsequent LBT idle, and SSBs #0 to #3 are transmitted at changed transmission candidate positions. RMSI #0 to #3 corresponding to SSBs #0 to #3 are also transmitted at changed transmission positions. The UE does not detect SSBs #0 to #3 in slots #0 and #1, and thus, does not perform PDCCH monitoring of RMSI #0 to #3 in slots #0 to #3. When the UE detects SSB #4, the UE recognizes that there are SSBs #0 to #3 that could not be transmitted at the original transmission candidate positions by information included in SSB #4, detects SSBs #0 to #3 at changed transmission positions, and performs PDCCH monitoring of RMSI #0 to #4 at the changed transmission positions.

The base station may fill resources of RMSI #0 to #4 by transmitting a given signal (for example, a dummy signal) at original transmission positions of RMSI #0 to According to aspect 2, even when the RMSI PDCCH is not transmitted by the LBT busy and a transmission timing of the RMSI PDCCH is changed, the UE can appropriately monitor the RMSI PDCCH.

<Aspect 3>

In at least one resource of a gap between SSBs and a period other than an SSB symbol in an SSB band in a case of using multiplexing pattern 2 or 3, the UE may assume that a given signal or channel other than RMSI PDCCH and RMSI PDSCH is transmitted. The given signal may be a CSI-RS.

It may not be defined in a specification to map a given signal or a given channel to the resource. In this case, the base station may realize continuous transmission by transmitting a dummy signal in the resource. The dummy signal may be a preamble, DCI common to the UE, a reference signal, or the like.

The base station may perform LBT on the resource. An LBT time in the gap between SSBs may be shorter than a LBT time for obtaining a transmission opportunity of data transmission. As a result, it is possible to satisfy the LBT regulation. In addition, it is possible to increase a transmission probability of SSB due to the short LBT time.

(Radio Communication System)

A configuration of a radio communication system according to an embodiment of the present disclosure is hereinafter described. In this radio communication system, communication is performed using one or a combination of the radio communication methods according to the embodiments of the present disclosure.

Figure 18:
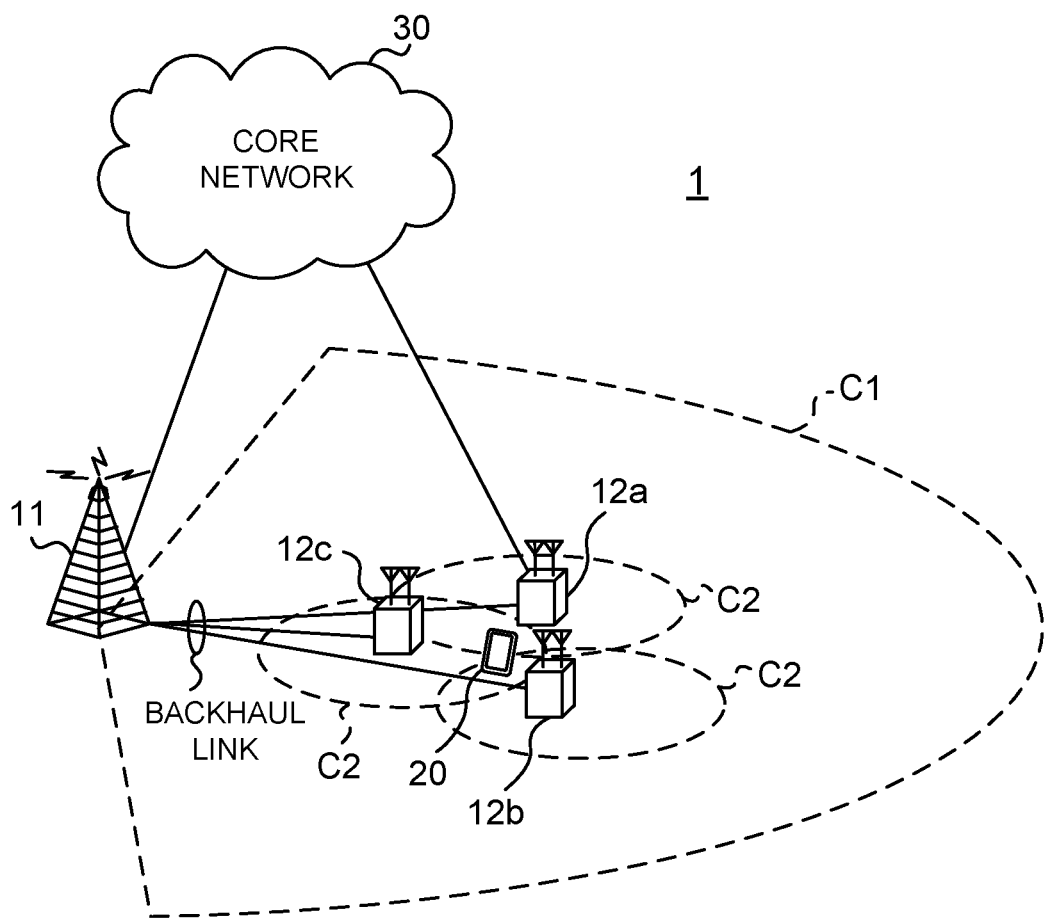
FIG. 18 is a diagram illustrating an example of a schematic configuration of a radio communication system according to an embodiment.

FIG. 18 is a diagram illustrating an example of a schematic configuration of a radio communication system according to an embodiment. A radio communication system 1 may be a system that implements communication using long term evolution (LTE), 5th generation mobile communication system new radio (5G NR), and the like specified by third generation partnership project (3GPP).

Further, the radio communication system 1 may support dual connectivity (multi-RAT dual connectivity (MR-DC)) between a plurality of RATS (Radio Access Technology). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

The user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by the user terminals 20, a physical broadcast channel (PBCH), a physical downlink control channel (PDCCH), or the like may be used.

In the radio communication system 1, as an uplink channel, a physical uplink shared channel (PUSCH) shared by the user terminals 20, a physical uplink control channel (PUCCH), a physical random access channel (PRACH), or the like may be used.

User data, higher layer control information and SIBs (System Information Blocks) are transmitted in the PDSCH. PUSCH may transmit user data, higher layer control information, and the like. PBCH may transmit master information block (MIB).

PDCCH may transmit lower layer control information. The lower layer control information may include, for example, downlink control information (DCI) including scheduling information of at least one of PDSCH and PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

A control resource set (CORESET) and a search space may be used to detect PDCCH. CORESET corresponds to a resource that searches for DCI. The search space corresponds to a search area and a search method for PDCCH candidates. One CORESET may be associated with one or more search spaces. UE may monitor CORESET associated with a certain search space based on search space configuration.

One SS may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

By means of PUCCH, channel state information (CSI), delivery confirmation information (for example, hybrid automatic repeat request acknowledgement (HARQ-ACK), which may be referred to as ACK/NACK or the like), scheduling request (SR), and the like may be transmitted. By means of PRACH, a random access preamble for establishing a connection with a cell may be transmitted.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SSB (SS Block), and the like. Note that SS, SSB, or the like may also be referred to as a reference signal.

In the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)".

(Base Station)

Figure 19:
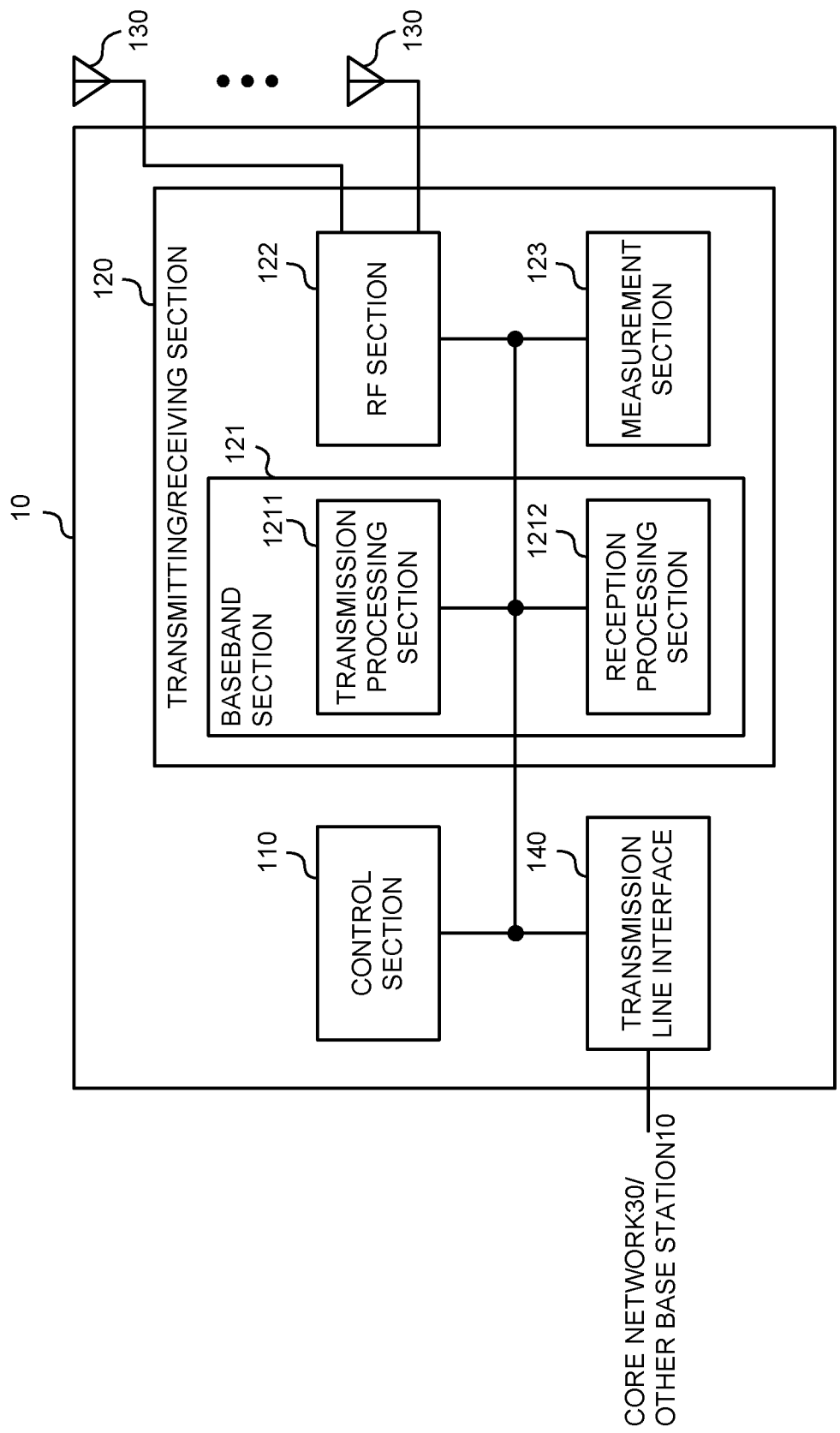
FIG. 19 is a diagram illustrating an example of a configuration of a base station according to an embodiment.

FIG. 19 is a diagram illustrating an example of a configuration of a base station according to an embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example will primarily illustrate functional blocks that pertain to characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data acquired from the control section 110 or control information to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

(User Terminal)

Figure 20:
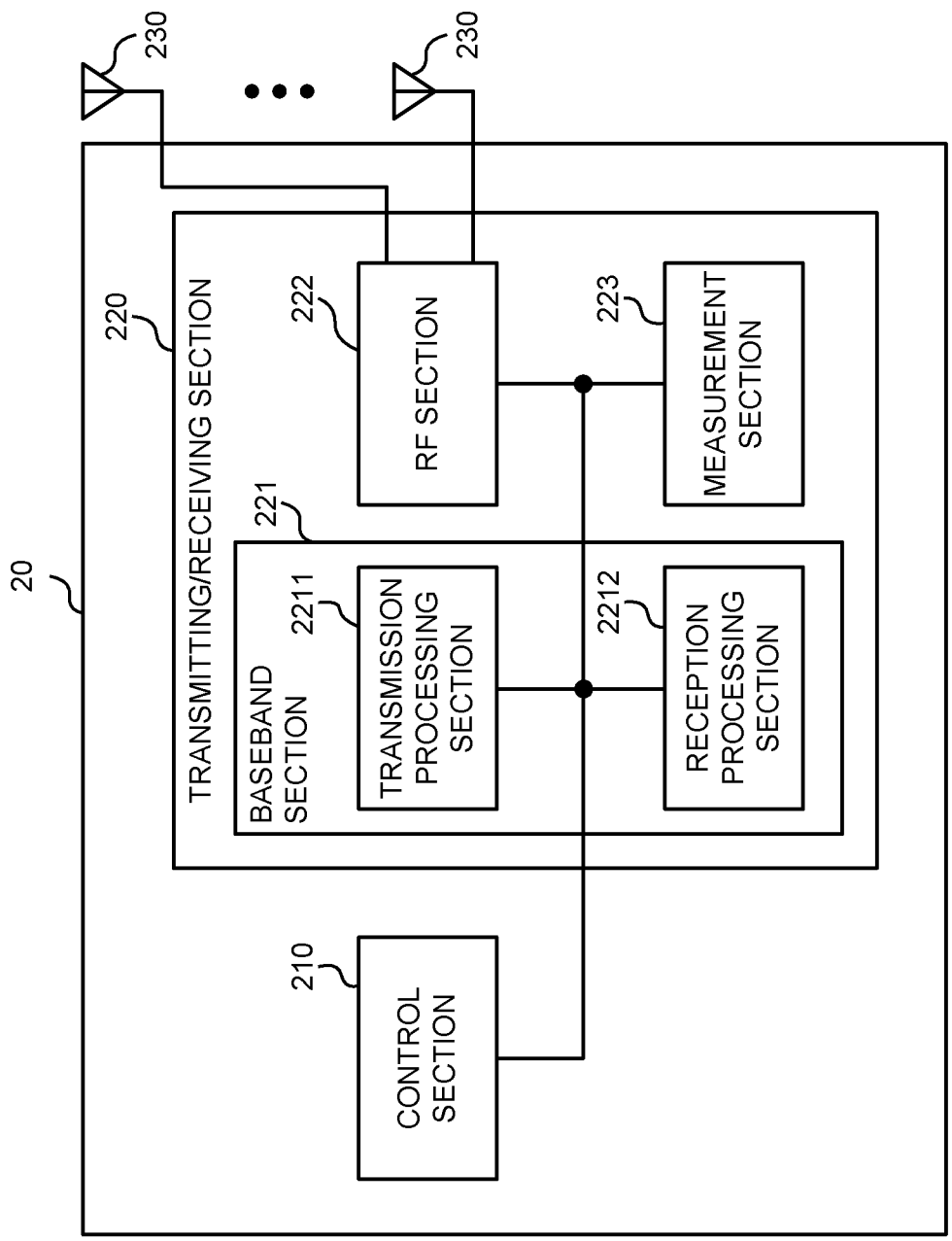
FIG. 20 is a diagram illustrating an example of a configuration of a user terminal according to an embodiment.

FIG. 20 is a diagram illustrating an example of a configuration of a user terminal according to an embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, and the transmission line interface 240.

Further, the transmitting/receiving section 220 may receive a first synchronization signal block (RMSI PDCCH, type0-PDCCH, or the like) in a first carrier (NR-U target frequency) to which listening (LBT (Listen Before Talk)) is applied, and monitor a first downlink control channel for scheduling first system information (RMSI, SIB1, or the like) based on the first synchronization signal block. The control section 210 may determine resources (multiple pattern, PDCCH monitoring occasion, and the like) of the first downlink control channel using a determination method different from a determination method of resources of a second downlink control channel for scheduling second system information in a second carrier (NR target frequency) to which the listening is not applied.

Further, the control section 210 may interpret a specific field for configuring the first downlink control channel differently from a specific field for configuring the second downlink control channel (Aspect 1).

Further, the first downlink control channel may be frequency-division-multiplexed with at least a part of the first synchronization signal block (multiplexing pattern 3, for example, FIG. 14A), or the first downlink control channel may be time-division-multiplexed with the first synchronization signal block (multiplex pattern 1) and at least a part of a downlink shared channel carrying the first system information may be frequency-division-multiplexed with the first synchronization signal block (for example, FIG. 14B).

Further, when the first downlink control channel is not transmitted at a transmission timing configured based on the first synchronization signal block, the first downlink control channel may be transmitted at another transmission timing (Aspect 2).

Further, the control section 210 may determine a monitoring opportunity of the first downlink control channel based on at least one of information indicating a transmission timing after a change (for example, FIG. 15), a signal indicating a head of a transmission opportunity obtained by the listening (for example, FIG. 16), and detection of the first synchronization signal block (for example, FIG. 17).

(Hardware Configuration)

Note that the block diagrams that have been used to describe the above embodiments illustrate blocks in functional units. These functional blocks (configuration units) may be implemented in arbitrary combinations of at least one of hardware or software. Also, the method for implementing each functional block is not particularly limited. That is, each functional block may be achieved by a single device physically or logically aggregated, or may be achieved by directly or indirectly connecting two or more physically or logically separate devices (using wires, radio, or the like, for example) and using these plural devices. The functional block may be achieved by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and so on. For example, a functional block (configuration unit) that causes transmission to function may be called a transmitting unit, a transmitter, and the like. In any case, as described above, the implementation method is not particularly limited.

Figure 21:
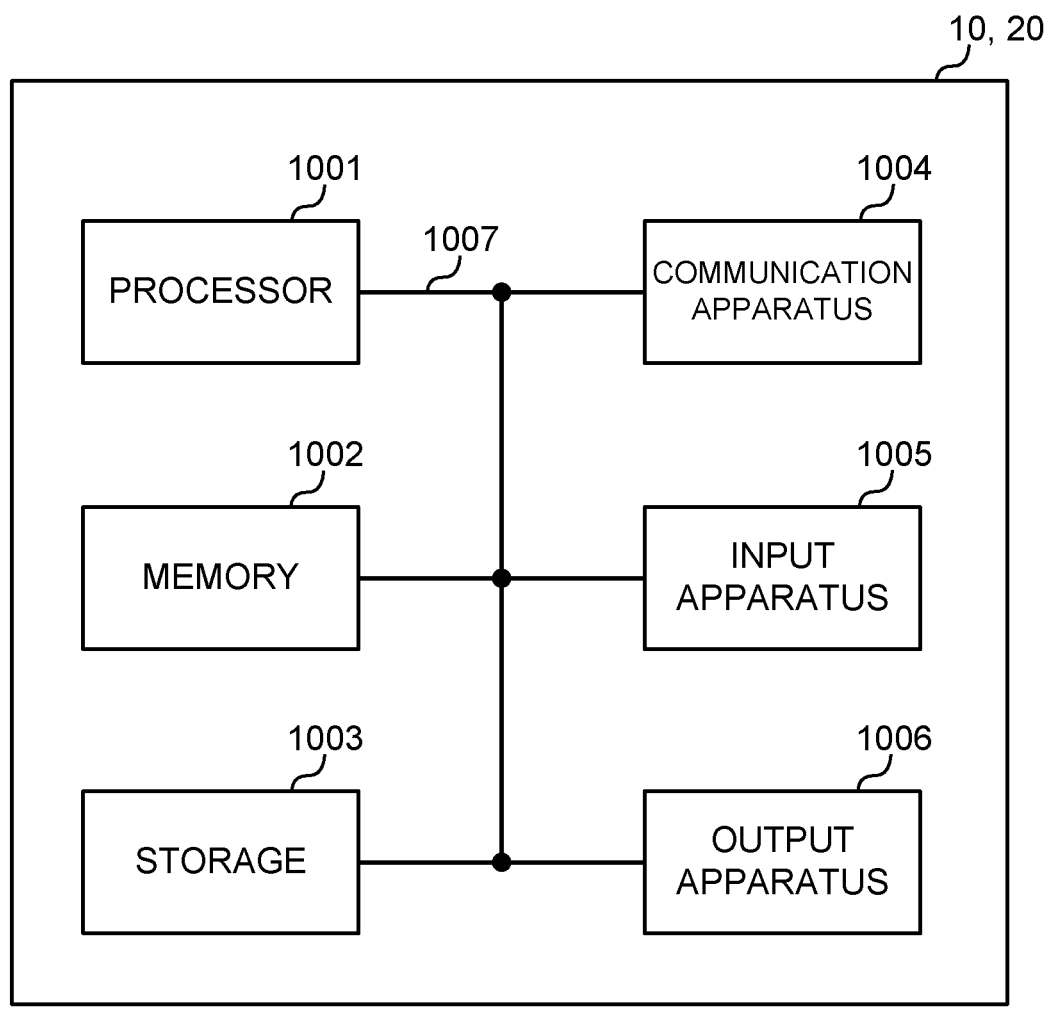
FIG. 21 is a diagram illustrating an example of a hardware configuration of the base station and the user terminal according to an embodiment.

For example, the base station, the user terminal, and so on according to an embodiment of the present disclosure may function as a computer that executes the processing of the radio communication method of the present disclosure. FIG. 21 is a diagram illustrating an example of a hardware configuration of the base station and the user terminal according to an embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the terms such as an apparatus, a circuit, an apparatus, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Furthermore, processes may be implemented with one processor, or processes may be implemented in parallel, in sequence, or in different manners, on two or more processors. Note that the processor 1001 may be implemented with one or more chips.

Each function of the base station 10 and the user terminal 20 is implemented by, for example, reading predetermined software (program) into hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be constituted by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and/or other appropriate storage media. The memory 1002 may be referred to as a "register", a "cache", a "main memory (primary storage apparatus)", and so on. The memory 1002 can store a program (program code), a software module, and the like, which are executable for implementing the radio communication method according to an embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120a (220a) and the receiving section 120b (220b) from each other.

The input apparatus 1005 is an input device for receiving input from the outside (for example, a keyboard, a mouse, a microphone, a switch, a button, a sensor, and so on). The output apparatus 1006 is an output device for allowing sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002, and so on are connected by the bus 1007 so as to communicate information. The bus 1007 may be formed with a single bus, or may be formed with buses that vary between pieces of apparatus.

Also, the base station 10 and the user terminal 20 may be configured to include hardware such as a microprocessor, a digital signal processor (DSP), an application-specific integrated circuit (ASIC), a programmable logic device (PLD), a field programmable gate array (FPGA), and so on, and part or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with other terms that have the same or similar meanings. For example, a channel, a symbol, and a signal (or signaling) may be replaced with each other. The signal may be a message. A reference signal can be abbreviated as an "RS", and may be referred to as a "pilot", a "pilot signal", and so on, depending on which standard applies. Furthermore, a "component carrier (CC)" may be referred to as a "cell", a "frequency carrier", a "carrier frequency", and so on.

A radio frame may be formed with one or more durations (frames) in the time domain. Each of one or more periods (frames) constituting a radio frame may be referred to as a "subframe". Furthermore, a subframe may be formed with one or multiple slots in the time domain. A subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain, and so on.

A slot may be formed with one or more symbols in the time domain (Orthogonal Frequency Division Multiplexing (OFDM) symbols, Single Carrier Frequency Division Multiple Access (SC-FDMA) symbols, or the like). Also, a slot may be a time unit based on numerology.

A slot may include a plurality of minislots. Each minislot may be formed with one or more symbols in the time domain. Also, a minislot may be referred to as a "subslot". Each minislot may be formed with fewer symbols than a slot. A PDSCH (or PUSCH) transmitted in a time unit larger than a minislot may be referred to as "PDSCH (PUSCH) mapping type A". A PDSCH (or PUSCH) transmitted using a minislot may be referred to as "PDSCH (PUSCH) mapping type B".

A radio frame, a subframe, a slot, a minislot and a symbol all represent the time unit in signal communication. A radio frame, a subframe, a slot, a minislot, and a symbol may be each called by other applicable names. Note that time units such as a frame, a subframe, a slot, a minislot, and a symbol in the present disclosure may be replaced with each other.

For example, one subframe may be referred to as "TTI", a plurality of consecutive subframes may be referred to as "TTI", or one slot or one mini slot may be referred to as "TTI". That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", and so on, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks, codewords, and so on, or may be the unit of processing in scheduling, link adaptation, and so on. Note that when TTI is given, a time interval (for example, the number of symbols) in which the transport blocks, the code blocks, the codewords, and the like are actually mapped may be shorter than TTI.

Note that, when one slot or one minislot is referred to as a "TTI", one or more TTIs (that is, one or multiple slots or one or more minislots) may be the minimum time unit of scheduling. Also, the number of slots (the number of minislots) to constitute this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. A TTI that is shorter than the usual TTI may be referred to as "shortened TTI", "short TTI", "partial TTI" (or "fractional TTI"), "shortened subframe", "short subframe", "minislot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be 12, for example. The number of subcarriers included in the RB may be determined based on numerology.

Also, an RB may include one or more symbols in the time domain, and may be one slot, one minislot, one subframe, or one TTI in length. One TTI, one subframe, and the like may be each formed with one or more resource blocks.

Note that one or more RBs may be referred to as a "physical resource block (PRB (Physical RB))", a "subcarrier group (SCG)", a "resource element group (REG)", a "PRB pair", an "RB pair", and so on.

Furthermore, a resource block may be comprised of one or more resource elements (REs). For example, one RE may be a radio resource field of one subcarrier and one symbol.

The bandwidth part (BWP) (which may be called partial bandwidth and the like) may represent a subset of consecutive common RB (common resource blocks) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a predetermined signal/channel outside the active BWP. Note that "cell", "carrier", and the like in the present disclosure may be replaced with "BWP".

Note that the structures of radio frames, subframes, slots, minislots, symbols, and so on described above are merely examples. For example, configurations pertaining to the number of subframes included in a radio frame, the number of slots included in a subframe or a radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs), and so on can be variously changed.

Furthermore, the information and parameters described in the present disclosure may be represented in absolute values, represented in relative values with respect to given values, or represented using other corresponding information. For example, a radio resource may be specified by a predetermined index.

The names used for parameters and so on in the present disclosure are in no respect limiting. In addition, an equation and so on using these parameters may differ from those explicitly disclosed in the present disclosure. Since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and the like described in the present disclosure may be represented by using a variety of different technologies. For example, data, instructions, commands, information, signals, bits, symbols, and chips, all of which may be referenced throughout the herein-contained description, may be represented by voltages, currents, electromagnetic waves, magnetic fields or particles, optical fields or photons, or any combination of these.

Also, information, signals, and the like can be output at least either from higher layers to lower layers, or from lower layers to higher layers. Information, signals and so on may be input and output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The reporting of information is by no means limited to the aspects/embodiments described in the present disclosure, and may be performed using other methods. For example, notification of information in the present disclosure may be performed by using physical layer signaling (for example, downlink control information (DCI), uplink control information (UCI), higher layer signaling (for example, radio resource control (RRC) signaling, broadcast information (master information block (MIB), system information block (SIB), or the like), medium access control (MAC) signaling, another signal, or a combination thereof.

Note that physical layer signaling may be referred to as "L1/L2 (Layer 1/Layer 2) control information (L1/L2 control signals)", "L1 control information (L1 control signal)", and so on. Furthermore, the RRC signaling may be called an RRC message, and may be, for example, an RRC connection setup message, an RRC connection reconfiguration message, and the like. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software", "firmware", "middleware", "microcode", or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSLs), and the like) or wireless technologies (infrared radiation, microwaves, and the like), at least one of these wired technologies or wireless technologies are also included in the definition of communication media.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" may be used interchangeably. The base station may be called a term such as a macro cell, a small cell, a femto cell, a pico cell, and the like.

A base station can accommodate one or more (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station or a base station subsystem that provides communication services within this coverage.

In the present disclosure, the terms "mobile station (MS)", "user terminal", "user equipment (UE)", "terminal", and the like may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station or a mobile station may be referred to as a transmitting apparatus, a receiving apparatus, a radio communication apparatus, or the like. Note that at least one of the base station and mobile station may be a device mounted on a moving body, a moving body itself, and the like. The moving body may be a transportation (for example, a car, an airplane and so on), an unmanned moving body (for example, a drone, an autonomous car, and so on), or a (manned or unmanned) robot. Note that at least one of the base station or the mobile station also includes a device that does not necessarily move during a communication operation. For example, at least one of the base station or the mobile station may be an IoT (Internet of Things) device such as a sensor.

Furthermore, the base stations in the present disclosure may be replaced with the user terminal. For example, each aspect/embodiment of the present disclosure may be applied to a structure in which communication between the base station and the user terminal is replaced with communication among a plurality of user terminals (which may be referred to as, for example, D2D (Device-to-Device), V2X (Vehicle-to-Everything), and so on). In this case, the user terminal 20 may be configured to have the functions of the base station 10 described above. In addition, the wording such as "up" and "down" may be replaced with the wording corresponding to the terminal-to-terminal communication (for example, "side"). For example, an uplink channel and a downlink channel may be replaced with a side channel.

Likewise, the user terminal in the present disclosure may be replaced with a base station. In this case, the base station 10 may be configured to have the functions of the user terminal 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, regarding the methods described in the present disclosure, elements of various steps are presented using an illustrative order, and are not limited to the presented particular order.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System for Mobile communications (GSM; registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra- WideBand (UWB), Bluetooth (registered trademark), systems that use other adequate radio communication methods, and/or next generation systems or the like that are enhanced based on these. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on".

Reference to elements with designations such as "first", "second", and so on as used in the present disclosure does not generally limit the number/quantity or order of these elements. These designations may be used in the present disclosure only for convenience, as a method for distinguishing between two or more elements. In this way, reference to the first and second elements does not imply that only two elements may be employed, or that the first element must precede the second element in some way.

The terms "judging (determining)" as used in the present disclosure may encompass a wide variety of actions. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and so on.

In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

In addition, to "judge (determine)" may be replaced with "assuming", "expecting", "considering", and so on.

The "maximum transmission power" described in the present disclosure may mean a maximum value of transmission power, nominal UE maximum transmit power, or rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the term may mean that "A and B are each different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be implemented with corrections and modifications, without departing from the spirit and scope of the invention defined by the recitations of claims. Consequently, the description of the present disclosure is provided for the purpose of exemplification and explanation, and has no limitative meaning to the invention according to the present disclosure.

The invention claimed is:

1. A terminal comprising:
   a receiver that, in an unlicensed spectrum, receives a first synchronization signal/physical broadcast channel (SS/PBCH) block and monitors, based on the first SS/PBCH block, a first downlink control channel used for scheduling of first system information; and
   a processor that determines, by using a first candidate, a first control resource set (CORESET) corresponding to the first downlink control channel,
   wherein the first candidate differs from a second candidate associated with a second CORESET corresponding to a second downlink control channel used for scheduling of second system information in a licensed spectrum, and
   a synchronization raster for the unlicensed spectrum differs from a synchronization raster for the licensed spectrum.

2. The terminal according to claim 1, wherein the processor performs interpretation of a specific field for the first downlink control channel configuration, the interpretation being different from interpretation of a specific field for the second downlink control channel configuration.

3. The terminal according to claim 1, wherein when a subcarrier spacing of the first downlink control channel is 30 kHz, a number of resource blocks of the first CORESET included in the first candidate is only 48, and when the subcarrier spacing is 15 kHz, the number is only 96.

4. The terminal according to claim 1, wherein when the first downlink control channel is not transmitted at a specific transmission timing configured based on the first SS/PBCH block, the first downlink control channel is transmitted at another transmission timing.

5. A radio communication method for a terminal, comprising:
   receiving, in an unlicensed spectrum, a first synchronization signal/physical broadcast channel (SS/PBCH) block;
   determining, by using a first candidate, a first control resource set (CORESET) corresponding to a first downlink control channel used for scheduling of first system information based on the first SS/PBCH block, wherein the first candidate differs from a second candidate associated with a second CORESET corresponding to a second downlink control channel used for scheduling of second system information in a licensed spectrum, and a synchronization raster for the unlicensed spectrum differs from a synchronization raster for the licensed spectrum; and monitoring the first downlink control channel.

6. A base station comprising:

a transmitter that, in an unlicensed spectrum, transmits a first synchronization signal/physical broadcast channel (SS/PBCH) block and transmits, based on the first SS/PBCH block, a first downlink control channel used for scheduling of first system information; and a processor that indicates, by using a first candidate, a first control resource set (CORESET) corresponding to the first downlink control channel, wherein the first candidate differs from a second candidate regarding a second CORESET corresponding to a second downlink control channel used for scheduling of second system information in a licensed spectrum, and a synchronization raster for the unlicensed spectrum differs from a synchronization raster for the licensed spectrum.

7. A system comprising a base station and a terminal, wherein the base station comprises:

a transmitter that, in an unlicensed spectrum, transmits a first synchronization signal/physical broadcast channel (SS/PBCH) block and transmits, based on the first SS/PBCH block, a first downlink control channel used for scheduling of first system information; and a processor that indicates, by using a first candidate, a first control resource set (CORESET) corresponding to the first downlink control channel, wherein the first candidate differs from a second candidate associated with a second CORESET corresponding to a second downlink control channel used for scheduling of second system information in a licensed spectrum, and a synchronization raster for the unlicensed spectrum differs from a synchronization raster for the licensed spectrum, and the terminal comprises:

a receiver that, in the unlicensed spectrum, receives the first SS/PBCH block and monitors, based on the first SS/PBCH block, the first downlink control channel; and a processor that determines, by using the first candidate, the first CORESET.

* * * * *